United States Patent
Watanabe et al.

(10) Patent No.: US 11,336,854 B2
(45) Date of Patent: May 17, 2022

(54) DISTANCE IMAGE CAPTURING APPARATUS AND DISTANCE IMAGE CAPTURING METHOD USING DISTANCE IMAGE CAPTURING APPARATUS

(71) Applicant: Brookman Technology, Inc., Hamamatsu (JP)

(72) Inventors: Takashi Watanabe, Hamamatsu (JP); Tomoyuki Akahori, Hamamatsu (JP)

(73) Assignee: Brookman Technology, Inc., Shizuoka (JP)

( * ) Notice: Subject to any disclaimer, the term of this patent is extended or adjusted under 35 U.S.C. 154(b) by 264 days.

(21) Appl. No.: 16/619,068

(22) PCT Filed: Mar. 1, 2019

(86) PCT No.: PCT/JP2019/008199
§ 371 (c)(1),
(2) Date: Dec. 3, 2019

(87) PCT Pub. No.: WO2020/178920
PCT Pub. Date: Sep. 10, 2020

(65) Prior Publication Data
US 2021/0368123 A1    Nov. 25, 2021

(51) Int. Cl.
*H04N 5/3745* (2011.01)
*H04N 5/355* (2011.01)
(Continued)

(52) U.S. Cl.
CPC ......... *H04N 5/37452* (2013.01); *G01S 17/89* (2013.01); *H04N 5/35563* (2013.01); *H04N 5/378* (2013.01)

(58) Field of Classification Search
None
See application file for complete search history.

(56) References Cited

U.S. PATENT DOCUMENTS

| | | | |
|---|---|---|---|
| 2017/0310914 A1* | 10/2017 | Tsuboi | ................. H04N 5/3696 |
| 2017/0315238 A1 | 11/2017 | Nagai | |
| 2018/0020172 A1 | 1/2018 | Hirota | |

FOREIGN PATENT DOCUMENTS

| | | |
|---|---|---|
| JP | 2006148284 A | 6/2006 |
| JP | 2006237789 A | 9/2006 |

(Continued)

OTHER PUBLICATIONS

"International Application No. PCT/JP2019/008199, International Search Report dated May 28, 2019", (dated May 28, 2019), 2 pgs.

(Continued)

*Primary Examiner* — Mark T Monk
(74) *Attorney, Agent, or Firm* — Schwegman Lundberg & Woessner, P.A.

(57) ABSTRACT

A distance image capturing apparatus has a light source unit that emits an intermittent light pulse into a space, a light receiving unit that includes a plurality of pixels each having a photoelectric conversion device and electric charge accumulating units, and a distance image processing unit. The distance image processing unit acquires an electric charge amount distributed by a predetermined fixed number of times and accumulated in the accumulating units. The distance image processing unit acquires electric charge amounts accumulated in the accumulating units with different number of times of electric charge distribution as one set and selects one of a first electric charge amount with a larger number of electric charge distribution and a second electric charge amount for acquiring a distance from a subject based on a comparison result with a threshold.

11 Claims, 11 Drawing Sheets

(51) Int. Cl.
  *G01S 17/89* (2020.01)
  *H04N 5/378* (2011.01)

(56) References Cited

FOREIGN PATENT DOCUMENTS

| | | | |
|---|---|---|---|
| JP | 2016095234 A | 5/2016 |
| JP | 2018082495 A | 5/2018 |
| JP | 6406449 B2 | 9/2018 |
| JP | 2018185179 A | 11/2018 |
| JP | 2018207413 A | 12/2018 |
| WO | WO-2013145765 A1 | 10/2013 |
| WO | WO-2016129410 A1 | 8/2016 |

OTHER PUBLICATIONS

"Japanese Application Serial No. 2020-502734, Notice of Allowance dated Dec. 15, 2020", w English Translation, (dated Dec. 15, 2020), 5 pgs.
"Japanese Application Serial No. 2017-529123, Notice of Allowance dated Dec. 15, 2020", w/ English Translation, (dated Dec. 15, 2020), 5 pgs.
Ohno, A., et al., "Wide Dynamic Range Image Sensor for Active Object Detection", Image-Media Processing Symposium The 12th Symposium Data, Japan, Institute of Electronics, Information and Communication Engineers, (Oct. 31, 2007), pp. 23-24.

* cited by examiner

DISTANCE IMAGE CAPTURING APPARATUS AND DISTANCE IMAGE CAPTURING METHOD USING DISTANCE IMAGE CAPTURING APPARATUS

PRIORITY APPLICATIONS

This application is a U.S. National Stage Filing under 35 U.S.C. 371 from International Application No. PCT/JP2019/008199, filed on Mar. 1, 2019, and published as WO/2020/178920 on Oct. 9, 2020; the benefit of priority of which is hereby claimed herein, and which application and publication are hereby incorporated herein by reference in their entireties.

TECHNICAL FIELD

The present invention relates to a distance image capturing apparatus and a distance image capturing method using a distance image capturing apparatus.

BACKGROUND ART

Conventionally, distance sensors of a time of flight (hereinafter referred to as "TOF") system measuring a distance from a subject that is a target object on the basis of a flying time of light using the fact that the speed of light is known have been realized. In a distance sensor of the TOF system, near infrared light is emitted to a space of an imaging target, and a distance from a subject is measured on the basis of a difference between a time at which the near infrared light is emitted and a time at which the near infrared light reflected by the subject and returns, in other words, a flight time of the near infrared light.

In addition, among recent distance sensors of the TOF system, similar to a solid-state imaging device mounted in an image capturing apparatus, a so-called a distance image capturing apparatus, in which a plurality of pixels detecting light for measuring a distance are disposed in a two-dimensional matrix pattern, capable of acquiring not only information of a two-dimensional distance from a subject but also an image of the subject has also been realized.

In a distance image capturing apparatus, there is a system in which near infrared light having a pulse shape (hereinafter referred to as "pulse light") is emitted, and a flight time of the pulse light is measured on the basis of a difference between a time at which the pulse light is emitted and a time at which the pulse light reflected by a subject is detected, among a plurality of systems for measuring a distance from a subject. In a distance image capturing apparatus of such a system, there is an imaging device used as a sensor for acquiring information of a distance from a subject and an image of the subject having a configuration in which a plurality of electric charge accumulating parts and a component dividing electric charge among each of the electric charge accumulating parts are disposed within each pixel. In an imaging device having such a distribution configuration, a distance from a subject can be measured by dividing electric charge generated by a photoelectric conversion device of a pixel to each electric charge accumulating part and calculating a delay time of pulse light that arrives after being reflected by the subject on the basis of a ratio of electric charges of each electric charge accumulating units.

In an imaging device having the distribution configuration, the number of times corresponding to light pulses in which electric charge is distributed to each electric charge accumulating part becomes a sensitivity when a distance from a subject is measured in each pixel. For this reason, in a conventional imaging device having the distribution configuration, generally, the number of times electric charge is divided to the electric charge accumulating parts is fixed to a constant number, in other words, a predetermined number.

It is necessary for a distance image capturing apparatus to measure a distance from a subject in various situations and surroundings. For example, there are cases in which a subject from which a distance is measured is located at a close position, a surrounding of a subject is bright and strong light (background light) is incident from a backside of the subject, or a subject has high reflectivity for near infrared light. In such a case, when the number of times electric charge is divided to the electric charge accumulating parts is fixed, the amount of divided electric charge increases in each pixel, and the electric charge accumulating parts are saturated, whereby there is a problem in that the measurement accuracy of a distance from a subject deteriorates, or a distance from the subject cannot be measured. In contrast, for example, there are cases in which a subject is located at a far position, a surrounding of a subject is dark, or a subject has a low reflectivity for near infrared light. In such cases, in an imaging device having the distribution configuration in which the number of times electric charge is divided to the electric charge accumulating parts is fixed, the amount of divided electric charge becomes small in each pixel, and there is a problem in that the measurement accuracy of a distance from a subject deteriorates, or a distance from a subject cannot be measured. For this reason, in a distance image capturing apparatus, it is preferable to widen a distance range in which a distance from a subject can be measured, in other words, to widen a dynamic range of distance measurement.

In this regard, for example, a technology relating to a distance sensor (distance image capturing apparatus) as disclosed in Japanese Patent No. 6406449 has been proposed. In the technology of the distance sensor disclosed in Japanese Patent No. 6406449, a control unit controls a light receiving unit (an imaging device having a distribution configuration), such that the light receiving unit accumulates the amount of light that has been received during a predetermined time from the start of a light emission time at which a light source unit emits light and changes the number of times the light receiving unit accumulates the amount of received light in accordance with the accumulated amount of received light. In addition, in the technology of the distance sensor disclosed in Patent Literature 1, the control unit changes a light reception period in accordance with the accumulated amount of received light. In other words, in the technology of the distance sensor disclosed in Japanese Patent No. 6406449, the amount of received light accumulated each time by the light receiving unit is used as feedback for the number of accumulation and a light reception period for the next time. In this way, in the distance sensor disclosed in Patent Literature 1, a deterioration in the measurement accuracy can be suppressed when a distance from a subject is measured in a situation in which background light is strong.

CITATION LIST

Patent Literature

[Patent Literature 1]
Japanese Patent No. 6406449

SUMMARY OF INVENTION

Technical Problem

However, according to the technology of the distance sensor disclosed in Patent Literature 1, a decrease in the measurement accuracy of a distance from a subject is suppressed through feedback control. For this reason, in the distance sensor disclosed in Patent Literature 1, a configuration and control for performing feedback control are necessary, and the configuration and the control of the distance sensor become complicated.

The present invention is based on the aforementioned problems, and an object thereof is to provide a distance image capturing apparatus using an imaging device of a distributable configuration and a distance image capturing method using a distance image capturing apparatus capable of widening a range in which a distance from a subject is measured by decreasing influences by changes in a status of a subject for distance measurement and environments without employing a complicated configuration or performing complex control.

Solution to Problem

According to a first aspect of the present invention, there is provided a distance image capturing apparatus comprising: a light source unit that emits an intermittent light pulse into a space that is an imaging target at a predetermined period; a light receiving unit that includes a distance image sensor in which a plurality of pixels each including a photoelectric conversion device generating electric charge corresponding to incident light and a plurality of electric charge accumulating units accumulating the electric charge and distributing and accumulating the electric charge to the electric charge accumulating units in synchronization with emission of the light pulse are arranged in a two-dimensional matrix pattern; and a distance image processing unit that acquires a distance from a subject present in the space on the basis of an electric charge amount that is an amount of the electric charge distributed by a predetermined fixed number of electric charge distribution and added up in each of the electric charge accumulating units.

The distance image processing unit acquires at least two electric charge amounts added up in the electric charge accumulating units with different numbers of electric charge distribution in the distance image sensor as one set, and selects one of a first electric charge amount that is the electric charge amount added up with a larger number of electric charge distribution and a second electric charge amount as an electric charge amount used for acquiring the distance, the second electric charge amount being the electric charge amount added up with a smaller number of electric charge distribution acquired as the set with the first electric charge amount, on the basis of a comparison result of the first electric charge amount with a threshold set in advance.

According to a second aspect of the present invention, in the distance image capturing apparatus according to the first aspect, the first electric charge amount and the second electric charge amount may be amounts of the electric charge including electric charge generated in accordance with reflective light acquired by causing the light pulse to be reflected by the subject.

According to a third aspect of the present invention, in the distance image capturing apparatus according to the second aspect, the distance image processing unit may select the first electric charge amount when the first electric charge amount is equal to or smaller than the threshold and selects the second electric charge amount when the first electric charge amount exceeds the threshold.

According to a fourth aspect of the present invention, in the distance image capturing apparatus according to the third aspect, the first electric charge amount may include a (1-1)-th electric charge amount that is the amount of electric charge including electric charge generated in accordance with the reflective light during a period in which the light pulse is emitted and a (1-2)-th electric charge amount that is the amount of electric charge including electric charge generated in accordance with the reflective light during a period after stop of the emission of the light pulse, and the distance image processing unit may select one of the first electric charge amount and the second electric charge amount as an electric charge amount used for acquiring the distance on the basis of a result of comparison between Qa and Qb, the Qa being a larger electric charge amount out of the (1-1)-th electric charge amount and the (1-2)-th electric charge amount, and the Qa being the threshold.

According to a fifth aspect of the present invention, in the distance image capturing apparatus according to any one of the first to fourth aspects, the distance image processing unit may output a flag signal that represents the electric charge amount selected for acquiring the distance.

According to a sixth aspect of the present invention, in the distance image capturing apparatus according to any one of the first to fifth aspects, the distance image processing unit may select an electric charge amount used for acquiring the distance for each of the pixels.

According to a seventh aspect of the present invention, in the distance image capturing apparatus according to any one of the first to fifth aspects, the distance image processing unit may select an electric charge amount used for acquiring the distance for each unit of a block acquired by dividing an area in which the pixels are arranged in the distance image sensor into a plurality of parts.

According to an eighth aspect of the present invention, in the distance image capturing apparatus according to any one of the first to seventh aspects, the threshold may be a value set for an electric charge amount that can be added up and stored in the electric charge accumulating units being saturated.

According to a ninth aspect of the present invention, in the distance image capturing apparatus according to the eighth aspect, the threshold may be variable.

According to a tenth aspect of the present invention, in the distance image capturing apparatus according to any one of the first to ninth aspects, the electric charge accumulating unit may include an electric charge accumulating capacitor that accumulates the electric charge.

According to an eleventh aspect of the present invention, there is provided a distance image capturing method using a distance image capturing apparatus that includes: a light source unit that emits an intermittent light pulse into a space that is an imaging target at a predetermined period; a light receiving unit that includes a distance image sensor in which a plurality of pixels each including a photoelectric conversion device generating electric charge corresponding to incident light and a plurality of electric charge accumulating units accumulating the electric charge and dividing and accumulating the electric charge among the electric charge accumulating units in synchronization with emission of the light pulse are arranged in a two-dimensional matrix pattern; and a distance image processing unit that acquires a distance from a subject present in the space on the basis of an electric charge amount that is an amount of the electric charge distributed by a predetermined fixed number of times of electric charge distribution and added up in each of the electric charge accumulating units.

The distance image capturing method includes acquiring at least two electric charge amounts added up in the electric charge accumulating units with different numbers of electric charge distribution in the distance image sensor as one set by the distance image processing unit, and selecting one of a first electric charge amount that is the electric charge amount added up with a larger number of electric charge distribution and a second electric charge amount as an electric charge amount used for acquiring the distance, the second electric charge amount being the electric charge amount added up with a smaller number of electric charge distribution acquired as the set with the first electric charge amount, on the basis of a comparison result of the first electric charge amount with a threshold set in advance by the distance image processing unit.

Advantageous Effects of Invention

According to each of the aspects described above, there is an advantage that it is possible to provide a distance image capturing apparatus using an imaging device having a distributable configuration and a distance image capturing method using a distance image capturing apparatus capable of widening a range in which a distance from a subject is measured by decreasing influences by a status of a subject for distance measurement and changes in environments without employing a complicated configuration or performing complex control.

DESCRIPTION OF EMBODIMENTS

Figure 1:
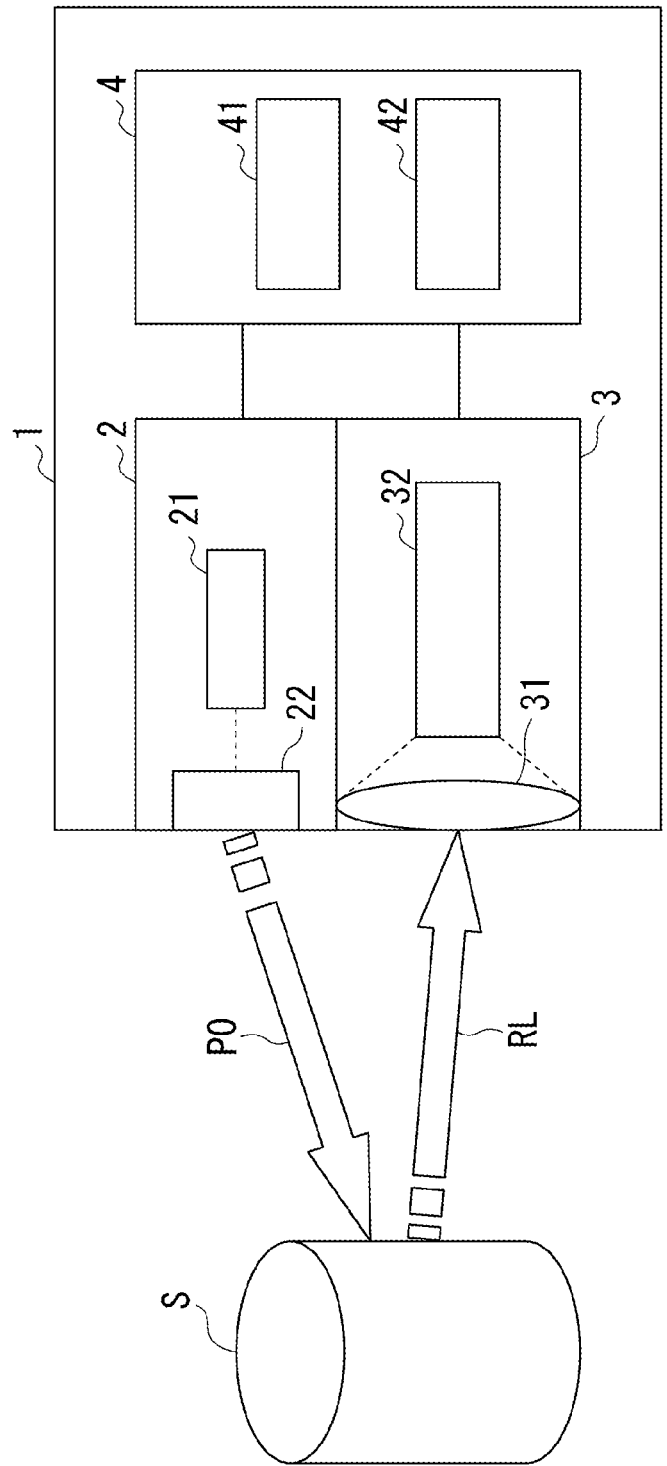
FIG. 1 is a block diagram illustrating a schematic configuration of a distance image capturing apparatus according to an embodiment of the present invention.

Hereinafter, an embodiment of the present invention will be described with reference to the drawings. FIG. 1 is a block diagram illustrating a schematic configuration of a distance image capturing apparatus according to an embodiment of the present invention. The distance image capturing apparatus 1 illustrated in FIG. 1 includes a light source unit 2, a light receiving unit 3, and a distance image processing unit 4. A subject S that is a target object for which a distance is measured by the distance image capturing apparatus 1 is also illustrated in FIG. 1.

The light source unit 2 emits an intermittent light pulse PO to a space in which the subject S that is a target for which a distance is measured by the distance image capturing apparatus 1 is present, at predetermined intervals in accordance with control by the distance image processing unit 4. The light source unit 2, for example, is a semiconductor laser module of a surface emission type such as a vertical cavity surface emitting laser (VCSEL). The light source unit 2 includes a light source device 21 and a diffusion plate 22.

The light source device 21 is a light source that emits laser light having a near infrared wavelength band (for example, the wavelength is in a wavelength band of 850 nm to 940 nm) that becomes a light pulse PO emitted to a subject S. The light source device 21, for example, is a semiconductor laser light emitting device. The light source device 21 emits laser light having a pulse shape in accordance with control by the timing control unit 41.

The diffusion plate 22 is an optical component that diffuses laser light of a near infrared wavelength band emitted from the light source device 21 to an area of an emission face for the subject S. Pulse-shaped laser light diffused by the diffusion plate 22 exits from the light source unit 2 as light pulse PO and is emitted to the subject S.

The light receiving unit 3 receives reflective light RL of the light pulse PO reflected by the subject S and outputs a pixel signal according to the received reflective light RL. The light receiving unit 3 includes a lens 31 and a distance image sensor 32.

The lens 31 is an optical lens and leads incident reflective light RL to the distance image sensor 32. The lens 31 exits the incident reflective light RL to the distance image sensor 32 and cause it to be received by (incident to) a pixel provided in a light reception area of the distance image sensor 32.

The distance image sensor 32 is an imaging device used in the distance image capturing apparatus 1. The distance image sensor 32 is an imaging device that includes a plurality of pixels in a two-dimensional light reception area and each pixel has a distribution configuration including one photoelectric conversion device, a plurality of electric charge accumulating units corresponding to one photoelectric conversion device, and a component distributing electric charge to each electric charge accumulating unit. The distance image sensor 32 divides electric charge generated by a photoelectric conversion device configuring a pixel to each electric charge accumulating unit and outputs a pixel signal corresponding to the amount of electric charge divided into each electric charge accumulating unit in accordance with control by the timing control unit 41.

A plurality of pixels is disposed in a two-dimensional matrix pattern in the distance image sensor 32, and a pixel signal for one frame corresponding to each pixel is output.

The distance image processing unit 4 is a control unit that controls the entire distance image capturing apparatus 1. In addition, the distance image processing unit 4 is an arithmetic calculation unit that calculates a distance from the subject S to be measured. The distance image processing unit 4 includes a timing control unit 41 and a distance calculating unit 42.

The timing control unit 41 controls a timing at which the light source unit 2 emits the light pulse PO to the subject S, a timing at which the distance image sensor 32 included in the light receiving unit 3 receives the reflective light RL, and the like.

The distance calculating unit 42 outputs distance information acquired by calculating a distance from the subject S on the basis of the pixel signal output from the distance image sensor 32.

By such a configuration, in the distance image capturing apparatus 1, the reflective light RL acquired by causing the light pulse PO of a near infrared wavelength band is emitted to and reflected by the subject S, from the light source unit 2, is received by the light receiving unit 3. Then the distance image processing unit 4 outputs distance information acquired by measuring a distance from the subject S.

Although the distance image capturing apparatus 1 having a configuration in which the distance image processing unit 4 is provided inside thereof is illustrated in FIG. 1, the distance image processing unit 4 may be a component provided outside the distance image capturing apparatus 1.

Figure 2:
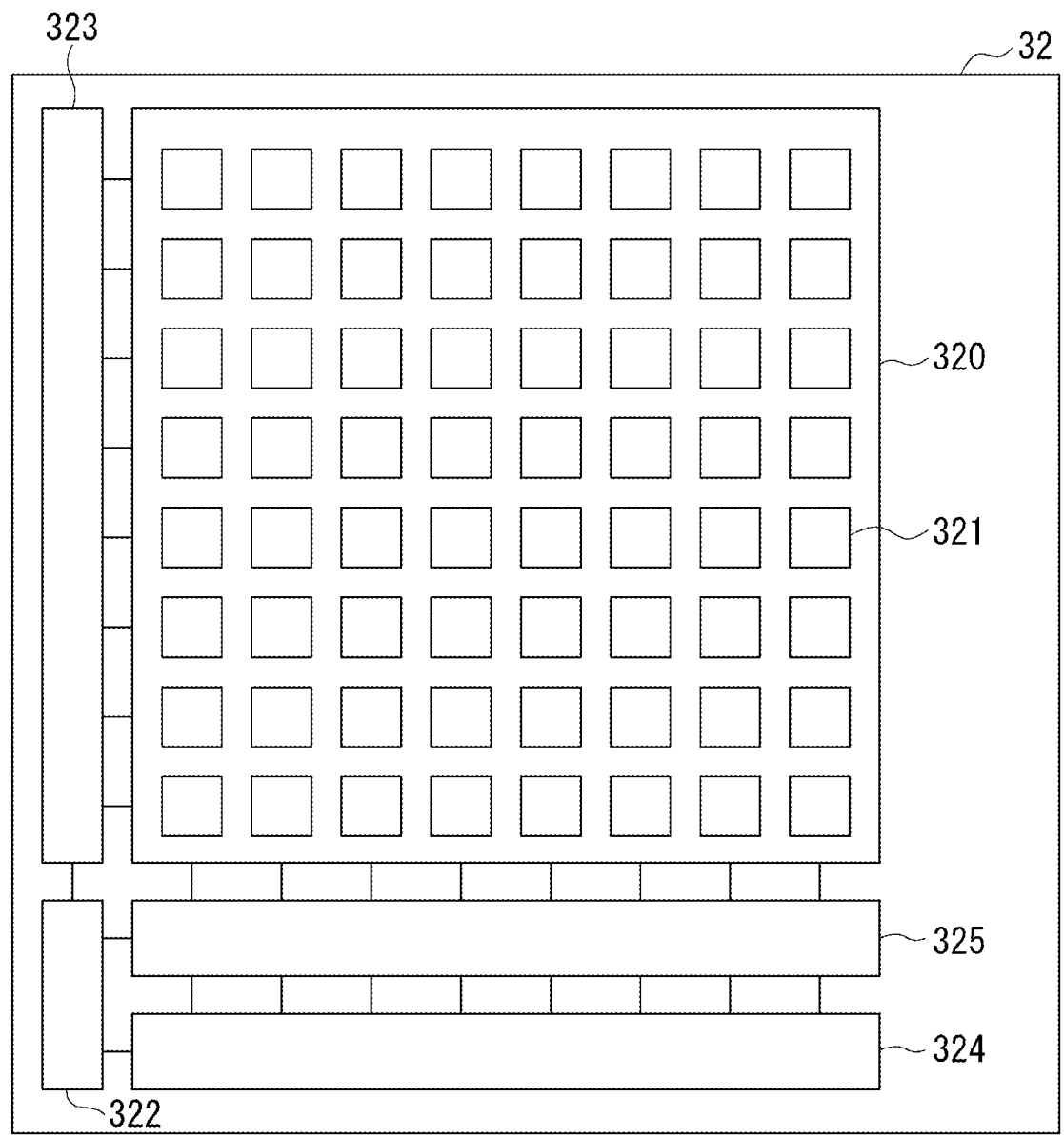
FIG. 2 is a block diagram illustrating a schematic configuration of an imaging device used in the distance image capturing apparatus.

The configuration of the distance image sensor 32 used as an imaging device in the distance image capturing apparatus 1 will be described. FIG. 2 is a block diagram illustrating a schematic configuration of an imaging device (the distance image sensor 32) used in the distance image capturing apparatus 1. As illustrated in FIG. 2, the distance image sensor 32 includes a light reception area 320 in which a plurality of pixels 321 is disposed, a control circuit 322, a vertical scanning circuit 323, a horizontal scanning circuit 324, and a pixel signal processing circuit 325. In the distance image sensor 32 illustrated in FIG. 2, an example of the light reception area 320 in which the plurality of pixels 321 are disposed in a two-dimensional matrix pattern of eight rows and eight columns is illustrated.

The control circuit 322 controls constituent elements such as the vertical scanning circuit 323, the horizontal scanning circuit 324, the pixel signal processing circuit 325, and the like included in the distance image sensor 32. The control circuit 322, for example, controls operations of the constituent elements included in the distance image sensor 32 in accordance with control from the distance image processing unit 4 (more specifically, the timing control unit 41) included in the distance image capturing apparatus 1. Control of the constituent elements included in the distance image sensor 32 by the control circuit 322 may be, for example, directly performed by the distance image processing unit 4 (more specifically, the timing control unit 41). In such a case, the distance image sensor 32 may not include the control circuit 322.

The vertical scanning circuit 323 is a drive circuit that controls each pixel 321 disposed within the light reception area 320 in accordance with control from the control circuit 322 and outputs a signal of a voltage corresponding to an amount of electric charge acquired by photoelectric conversion on incident light (hereinafter, referred to as a "voltage signal") from each pixel 321 to a corresponding vertical signal line (causing the signal to be read). The vertical scanning circuit 323 outputs a drive signal used for driving (controlling) pixels 321 for each row of the pixels 321 disposed within the light reception area 320. At this time, the vertical scanning circuit 323 distributes electric charge generated by a photoelectric conversion device composing the pixel 321 to a plurality of electric charge accumulating unit. In other words, the vertical scanning circuit 323 includes an electric charge distribution drive circuit. In this way, a voltage signal corresponding to an amount of electric charge divided for each electric charge accumulating unit in the pixel 321 is read into a vertical signal line corresponding for each row of the light reception area 320 and is output to the pixel signal processing circuit 325.

Each pixel 321 disposed within the light reception area 320 receives incident light, in other words, the reflective light RL (the light pulse PO reflected by the subject S) and generates electric charge corresponding to an amount (an amount of received light) of the received reflective light RL. In each pixel 321, electric charge corresponding to an amount (an amount of received light) of the received reflective light RL is distributed to one of a plurality of electric charge accumulating units in accordance with a drive signal input from the vertical scanning circuit 323. Then, each pixel 321 outputs a voltage signal having a magnitude corresponding to the amount of electric charge that is distributed and accumulated in each electric charge accumulating unit to a corresponding vertical signal line. Detailed descriptions of a configuration and a driving (controlling) method of the pixel 321 will be presented later.

The pixel signal processing circuit 325 is a signal processing circuit that performs signal processing set in advance for a voltage signal output from the pixel 321 of each column to a corresponding vertical signal line in accordance with control from the control circuit 322. As an example of the signal processing set in advance, there is a noise suppression process of suppressing a noise included in a voltage signal through correlated double sampling (CDS) and the like. As another example of the signal processing set in advance, there is an analog/digital conversion (A/D conversion) process for a conversion into a digital value representing the magnitude of an analog voltage signal and the like.

The pixel signal processing circuit 325 may be a pixel signal processing circuit group configured by a plurality of pixel signal processing circuits corresponding to the columns of the light reception area 320. In such a case, the pixel signal processing circuit 325 outputs a voltage signal after the signal processing set in advance to a horizontal signal line for each row of the light reception area 320 in accordance with control from the horizontal scanning circuit 324.

The horizontal scanning circuit 324 is a drive circuit that sequentially outputs (reads out) voltage signals after signal processing, the voltage signals being output from the pixel signal processing circuit 325, to horizontal signal lines in accordance with control from the control circuit 322. The horizontal scanning circuit 324 sequentially outputs control signals for outputting voltage signals corresponding to pixels 321 of each column, to the pixel signal processing circuit 325. In this way, pixel signals corresponding to one frame are sequentially output to the outside of the distance image sensor 32 through a horizontal signal line. At this time, the distance image sensor 32, for example, outputs a voltage signal after signal processing from an output circuit such as an output amplifier (not illustrated in the drawing) to the outside of the distance image sensor 32 as a pixel signal.

In the following description, the pixel signal processing circuit 325 included in the distance image sensor 32 will be described to perform a noise suppression process for a voltage signal output from the pixel 321, thereafter performs an A/D conversion process thereon, and outputs a resultant signal, in other words, outputs a voltage signal converted into a digital value.

Figure 3:
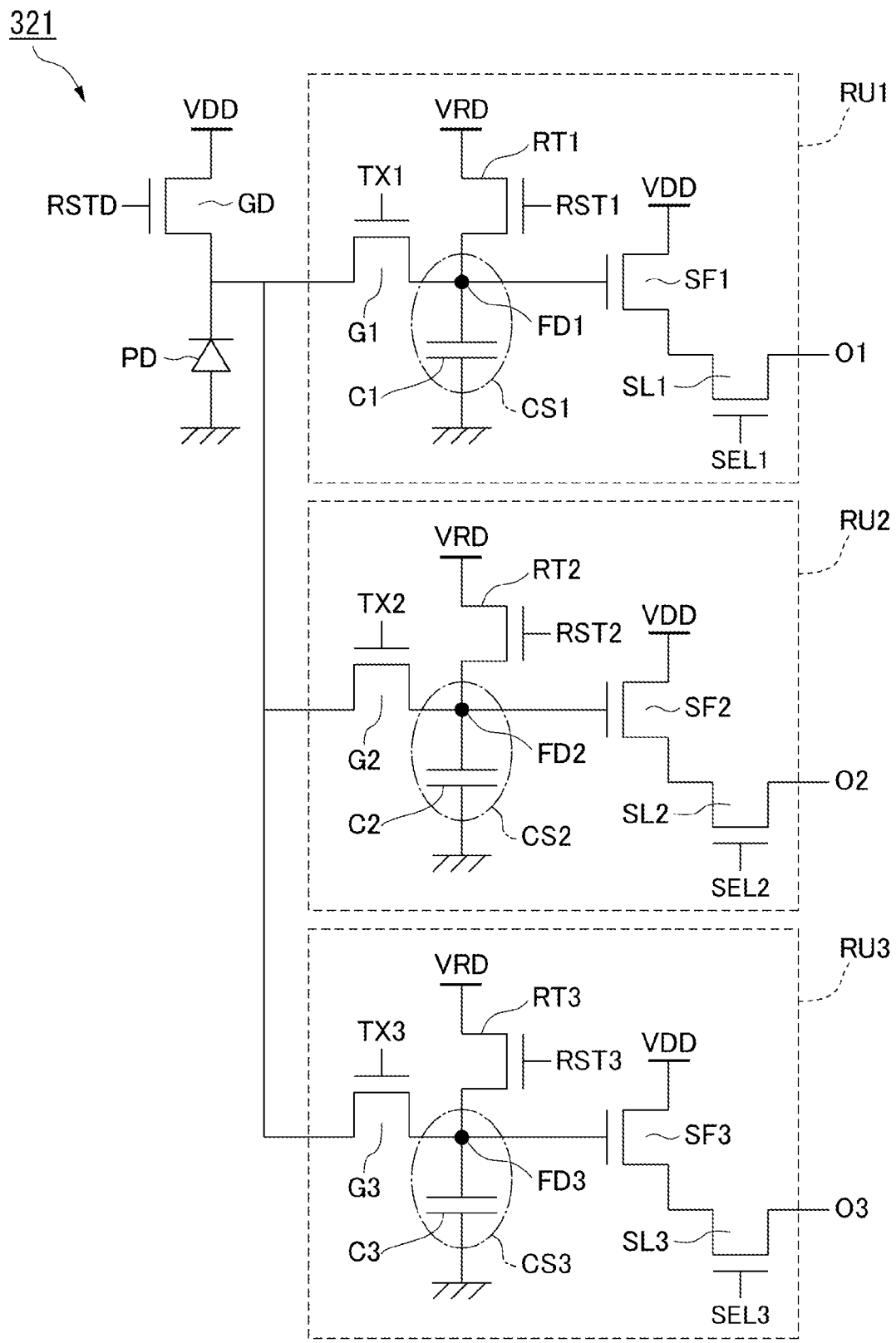
FIG. 3 is a circuit diagram illustrating one example of the configuration of a pixel disposed in a light reception area of the imaging device.

Next, the configuration of the pixel 321 disposed within the light reception area 320 included in the distance image sensor 32 will be described. FIG. 3 is a circuit diagram illustrating one example of the configuration of the pixel 321 disposed within the light reception area 320 of an imaging device (the distance image sensor 32) used in the distance image capturing apparatus 1. FIG. 3 illustrates an example of the configuration of one pixel 321 among a plurality of pixels 321 disposed within the light reception area 320. The pixel 321 is an example of a configuration including three pixel signal reading units.

The pixel 321 includes one photoelectric conversion device PD, a drain gate transistor GD, and three pixel signal reading units RU that output voltage signals from corresponding output terminals O. Each of the pixel signal reading units RU includes a reading gate transistor G, a floating diffusion FD, an electric charge accumulating capacitor C, a reset gate transistor RT, a source follower gate transistor SF, and a selection gate transistor SL. In each of the pixel signal reading units RU, an electric charge accumulating unit CS is composed of the floating diffusion FD and the electric charge accumulating capacitor C.

In FIG. 3, by assigning numbers "1", "2", and "3" to reference signs "RU" of three pixel signal reading units RU, the individual pixel signal reading units RU are identified from each other. Similarly, also for each component included in any one of the three pixel signal reading units RU, by indicating a number representing the pixel signal reading unit RU after their reference sign, the pixel signal reading unit RU to which each component corresponds is represented. In the pixel 321 illustrated in FIG. 3, the pixel signal reading unit RU1 that outputs a voltage signal from an output terminal O1 includes a reading gate transistor G1, a floating diffusion FD1, an electric charge accumulating capacitor C1, a reset gate transistor RT1, a source follower gate transistor SF1, and a selection gate transistor SL1. In the pixel signal reading unit RU1, an electric charge accumulating unit CS1 is composed of the floating diffusion FD1 and the electric charge accumulating capacitor C1. The pixel signal reading unit RU2 and the pixel signal reading unit RU3 have configurations similar thereto.

The photoelectric conversion device PD is a photodiode of an embedded type that generates electric charge by performing a photoelectric conversion on incident light and accumulates the generated electric charge. The structure of the photoelectric conversion device PD included in the pixel 321 is not particularly defined in the present invention. The photoelectric conversion device PD may be, for example, either a PN photo diode having a structure in which a P-type semiconductor and an N-type semiconductor are bonded to each other or a PIN photodiode having a structure in which an I-type semiconductor is interposed between a P-type semiconductor and an N-type semiconductor. The photoelectric conversion device included in the pixel 321 is not limited to a photodiode and, for example, may be a photoelectric conversion device of a photo gate type.

The drain gate transistor GD is a transistor for discarding electric charge that is generated and accumulated by the photoelectric conversion device PD in accordance with a drive signal input from the vertical scanning circuit 323 and is not transmitted to each pixel signal reading unit RU. In other words, the drain gate transistor GD is a transistor that resets electric charge that is generated by the photoelectric conversion device PD and is not used for measuring a distance to the subject S.

The reading gate transistor G is a transistor that is used for transmitting the electric charge generated and accumulated by the photoelectric conversion device PD to a corresponding electric charge accumulating unit CS. The electric charge transmitted by the reading gate transistor G is stored (accumulated) in a corresponding electric charge accumulating unit CS.

The floating diffusion FD is a capacitor that accompanies a node connected to a gate terminal of the source follower gate transistor SF and stores (accumulates) electric charge transmitted by a corresponding reading gate transistor G.

The electric charge accumulating capacitor C is a capacitor that stores (accumulates) electric charge transmitted by a corresponding reading gate transistor G.

The reset gate transistor RT is a transistor used for discharging electric charge stored in a corresponding electric charge accumulating unit CS in accordance with a drive signal input from the vertical scanning circuit 323. In other words, the reset gate transistor RT is a transistor that resets electric charge stored in a corresponding electric charge accumulating unit CS.

The source follower gate transistor SF is a transistor that is used for amplifying a voltage signal corresponding to the amount of electric charge accumulated in the electric charge accumulating unit CS connected to the gate terminal and outputting the amplified voltage signal to a corresponding selection gate transistor SL.

The selection gate transistor SL is a transistor used for outputting a voltage signal amplified by the corresponding source follower gate transistor SF from the corresponding output terminal O, in accordance with a drive signal input from the vertical scanning circuit 323.

By such a configuration, the pixel 321 divides the electric charge generated by a photoelectric conversion of incident light of the photoelectric conversion device PD for the three electric charge accumulating units CS and outputs voltage signals corresponding to the amounts of each divided electric charge to the pixel signal processing circuit 325.

The configuration of the pixel disposed in the distance image sensor 32 is not limited to the configuration including the three pixel signal reading units RU as illustrated in FIG. 3, and the pixel may have any configuration as long as the pixel has a configuration including one photoelectric conversion device PD and a plurality of pixel signal reading units RU to which the electric charge generated and accumulated by the photoelectric conversion device PD is distributed. In other words, the number of pixel signal reading units RU (electric charge accumulating units CS) disposed in the pixel disposed in the distance image sensor 32 may be two or more than four.

In the pixel 321 illustrated in FIG. 3, one example in which the electric charge accumulating unit CS is composed of the floating diffusion FD and the electric charge accumulating capacitor C is illustrated. However, the electric charge accumulating unit CS may be composed of at least the floating diffusion FD. In other words, the pixel 321 may have a configuration not including the electric charge accumulating capacitor C. In the case of such a configuration, there is an advantage of improving electric charge detection sensitivity. However, in the distance image capturing apparatus 1, a configuration capable of storing (accumulating) more electric charge is more advantageous in view of widening a dynamic range in the measurement of a distance. For this reason, in the pixel 321, by including the electric charge accumulating capacitor C in the pixel signal reading unit RU and configuring the electric charge accumulating unit CS using the floating diffusion FD and the electric charge accumulating capacitor C, a configuration capable of storing (accumulating) more electric charge than in a case in which the electric charge accumulating unit CS is configured by the floating diffusion FD only.

In the pixel 321 having the configuration illustrated in FIG. 3, although one example of the configuration including the drain gate transistor GD is illustrated, the pixel disposed in the distance image sensor 32 may not include the drain gate transistor GD in a case in which it is not necessary to discard electric charge accumulated (remaining) in the photoelectric conversion device PD.

Figure 4:
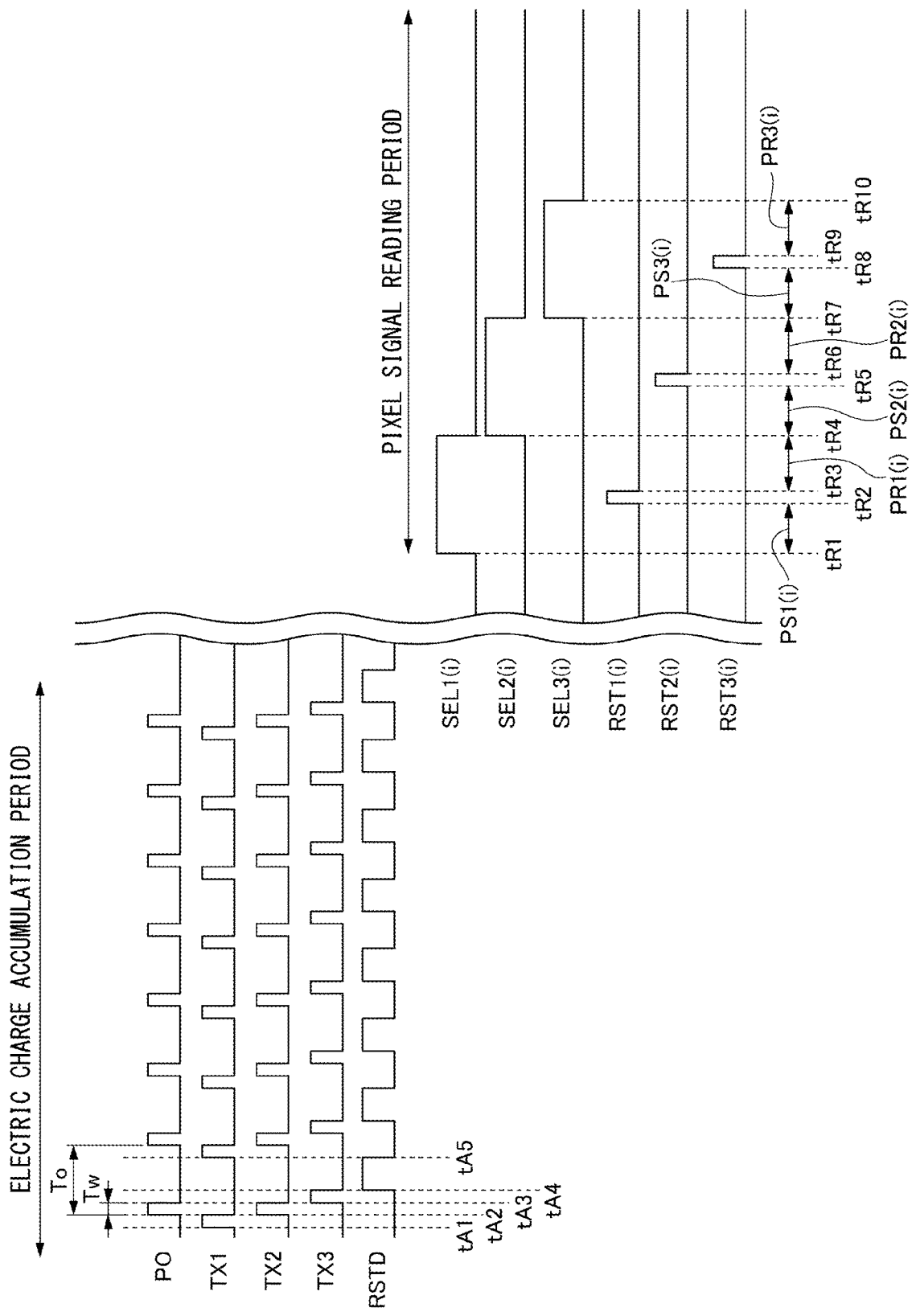
FIG. 4 is a timing diagram illustrating timings at which the pixel disposed in the light reception area is driven.

Next, a method (timings) of driving (controlling) the pixel 321 in the distance image capturing apparatus 1 will be described. FIG. 4 is a timing diagram illustrating timings at which the pixel 321 disposed within the light reception area 320 of an imaging device (the distance image sensor 32) used in the distance image capturing apparatus 1 is driven. FIG. 4 illustrates timings of the light pulse PO emitted by the light source unit 2 to a subject S together with timings of a drive signal of the pixel 321 when pixel signals corresponding to one frame are output to the distance image sensor 32.

First, driving (controlling) of the pixel 321 in an electric charge accumulation period in which electric charge generated and accumulated by the photoelectric conversion device PD according to an amount (light reception amount) of received light is distributed to each pixel signal reading unit RU will be described. In the electric charge accumulation period, a light pulse PO is emitted to a subject S by the light source unit 2. Then, by driving pixels 321 in synchronization with timings at which a light pulse PO is emitted, electric charge corresponding to background light and reflective light RL that have been received is distributed to respective electric charge accumulating unit CS. The vertical scanning circuit 323 distributes and accumulates electric charge to respective electric charge accumulating unit CS included in all the pixels 321 through so-called global driving in which all the pixels 321 disposed within the light reception area 320 are simultaneously driven. A time in which the light source device 21 emits pulse-shaped laser light, in other words, a pulse width Tw of the light pulse PO, is a very short time set in advance such as 10 nS (nanoseconds) or the like. The reason for this is that a maximum distance that can be measured (hereinafter, referred to as a "maximum measurement distance") is determined by the pulse width Tw of the light pulse PO in the measurement of a distance using a pulse modulation system. In a case in which the pulse width Tw of the light pulse PO is 10 nS, the maximum measurement distance becomes 1.5 m. In addition, by widening the pulse width Tw of the light pulse PO, in other words, by increasing an emission time of laser light in the light source device 21, although the photoelectric conversion device PD can receive more reflective light RL, the resolution of a distance from the subject S that is to be measured decreases. On the other hand, by shortening the pulse width Tw of the light pulse PO, the amount of electric charge generated through a photoelectric conversion by the photoelectric conversion device PD decreases. For this reason, emission of a light pulse PO and distribution of electric charge are performed a plurality of times such that a sufficient amount of electric charge is accumulated in each electric charge accumulating unit CS in an electric charge accumulation period in the distance image capturing apparatus 1.

In the electric charge accumulation period of the timing diagram illustrated in FIG. 4, driving timings of a light pulse PO and electric charge distribution in all the pixels 321 are illustrated. A light pulse PO in the electric charge accumulation period of the timing chart illustrated in FIG. 4 is described as one being emitted (laser light is emitted by the light source device 21) at the time of a "High" level, and being stopped (the light source device 21 is turned off) at the time of a "Low" level. The timing diagram illustrated in FIG. 4 is described as being started from a state in which all the pixels 321 are reset, in other words, no electric charge is accumulated in the photoelectric conversion devices PD and the electric charge accumulating units CS.

In the electric charge accumulation period, first, the vertical scanning circuit 323 transfers electric charge corresponding to background light before emission of the light pulse PO, which has been generated through a photoelectric conversion by the photoelectric conversion device PD, to the electric charge accumulating unit CS1 through the reading gate transistor G1 and accumulates the electric charge therein from a time tA1 that is a time point before the time point when the light source unit 2 emits the light pulse PO, by a length of time same as the pulse width Tw.

Thereafter, the vertical scanning circuit 323 transfers electric charge generated by the photoelectric conversion device PD in accordance with light that is currently photoelectrically converted by the photoelectric conversion device PD to the electric charge accumulating unit CS2 through the reading gate transistor G2 and accumulates the electric charge therein from the same time tA2 as a timing at which the light source unit 2 emits the light pulse PO. Here, the electric charge accumulated in the electric charge accumulating unit CS2 is electric charge corresponding to reflective light RL reflected by the subject S within the time of the pulse width Tw in which the light pulse PO is emitted. In this electric charge, in addition to the electric charge corresponding to the background light, electric charge corresponding to reflective light RL incident in a short delay time that is in proportion to the distance (absolute distance) to the subject S is included. More specifically, for example, in a case in which a subject S is located at a close position, the emitted light pulse PO is reflected by the subject S in a short delay time and is returned as reflective light RL, and accordingly, electric charge corresponding to the reflective light RL reflected by the subject S at the close position is included more in the electric charge accumulating unit CS2.

Thereafter, the vertical scanning circuit 323 transfers electric charge generated by the photoelectric conversion device PD in accordance with light that is currently photoelectrically converted by the photoelectric conversion device PD to the electric charge accumulating unit CS3 through the reading gate transistor G3 and accumulates the electric charge therein from the same time tA3 as a timing at which the light source unit 2 stops the emission of the light pulse PO. Here, the electric charge accumulated in the electric charge accumulating unit CS3 is electric charge corresponding to reflective light RL reflected by the subject S outside the time of the pulse width Tw in which the light pulse PO is emitted. In this electric charge, in addition to the electric charge corresponding to the background light, electric charge corresponding to reflective light RL incident in a long delay time that is in proportion to the distance (absolute distance) to the subject S is included. More specifically, for example, in a case in which a subject S is located at a far position, the emitted light pulse PO is reflected by the subject S and returned as reflective light RL requiring a longer delay time, and accordingly, electric charge corresponding to the reflective light RL reflected by the subject S at the far position is included more in the electric charge accumulating unit CS3.

Thereafter, the vertical scanning circuit 323 discards electric charge that has been generated in accordance with light currently photoelectrical-converted by the photoelectric conversion device PD, in other words, electric charge not used for measurement of the distance to the subject S through the drain gate transistor GD from a time tA4 that is a time point after the time tA3 by a length of time same as the pulse width Tw. In other words, the photoelectric conversion device PD is reset.

Thereafter, the vertical scanning circuit 323 releases the resetting of the photoelectric conversion device PD at a time tA5 that is a time point before the time point when the light source unit 2 emits the light pulse PO again, by a length of time same as the pulse width Tw. Then, similar to the timing from the time tA1, the vertical scanning circuit 323 transfers electric charge generated through a photoelectric conversion next time by the photoelectric conversion device PD, in other words, electric charge corresponding to background light before the next emission of the light pulse PO to the electric charge accumulating unit CS1 through the reading gate transistor G1 and accumulates the electric charge therein.

Thereafter, the vertical scanning circuit 323 repeats driving of pixels 321 similar to that from the time tA1 to the time tA5 (hereinafter, referred to as "electric charge distribution driving"). In this way, in the electric charge accumulation period, amounts of electric charge corresponding to the repetition of electric charge distribution driving are accumulated and stored in the electric charge accumulating units CS included in all the pixels 321. A maximum number of times the electric charge distribution driving is repeated in the electric charge accumulation period is determined in accordance with a period at which the distance image sensor 32 outputs (acquires) pixel signals corresponding to one frame. More specifically, the maximum number of times is the number of times corresponding to a quotient acquired by dividing Ta by To, where Ta is a remainder time of one frame period subtracted with a pixel signal reading period, and To is a pulse period time To of the light pulse PO. In the distance image sensor 32, the amount of electric charge accumulated (added up) in each electric charge accumulating unit CS increases as the number of times of electric charge distribution driving increases, whereby the sensitivity thereof becomes high. In this way, the resolution of a distance to a subject S that is to be measured can be improved in the distance image sensor 32.

Subsequently, driving (controlling) of pixels 321 in a pixel signal reading period in which voltage signals corresponding to the amounts of electric charge distributed to the electric charge accumulating units CS included in the pixel signal reading units RU are sequentially output for each row of pixels 321 disposed within the light reception area 320 after the end of the electric charge accumulation period will be described. In the pixel signal reading period, by using so-called rolling driving in which pixels 321 disposed within the light reception area 320 are driven for each row, voltage signals corresponding to the amounts of electric charge accumulated (added up) and stored in the electric charge accumulating units CS included in pixels 321 disposed in a corresponding row are output to the pixel signal processing circuit 325 in a row sequential manner.

As described above, in the distance image sensor 32, signal processing set in advance such as a noise suppression process, an A/D conversion process, and the like is performed on a voltage signal output by each pixel 321 by the pixel signal processing circuit 325. Here, a correlated double sampling (CDS) process performed by the pixel signal processing circuit 325 as a noise suppression process is a process of taking a difference between a voltage signal corresponding to the amount of electric charge accumulated (added up) and stored in the electric charge accumulating unit CS (hereinafter, referred to as a "distance pixel voltage signal PS") and a voltage signal corresponding to the amount of electric charge in a state in which the electric charge accumulating unit CS is reset (a reset state) (hereinafter, referred to as a "reset voltage signal PR"). For this reason, in a pixel signal reading period, voltage signals of a distance pixel voltage signal PS corresponding to each electric charge accumulating unit CS included in each pixel 321 and a reset voltage signal PR are output to the pixel signal processing circuit 325 in a row sequential manner.

In a pixel signal reading period represented in the timing diagram illustrated in FIG. 4, in a case in which a plurality of pixels 321 of y rows (y is an integer equal to or larger than "1") in a horizontal direction (row direction) and x columns (x is an integer equal to or larger than "1") in a vertical direction (column direction) of the light reception area 320 are disposed, driving timings of the pixels 321 in a case in which voltage signals including the distance pixel voltage signal PS(i) and the reset voltage signal PR(i) are output from pixels 321(i) disposed in the i-th row (1≤i≤y) of the light reception area 320. In the timing diagram illustrated in FIG. 4, voltage signals are output in order of the electric charge accumulating unit CS1(i), the electric charge accumulating unit CS2(i), and the electric charge accumulating unit CS3(i) included in each pixel 321(i).

In a pixel signal reading period, first, in a period of time tR1 to time tR2, the vertical scanning circuit 323 outputs a distance pixel voltage signal PS1(i) from an output terminal O1(i) to the pixel signal processing circuit 325 through a vertical signal line. In this way, the pixel signal processing circuit 325 temporarily stores the distance pixel voltage signal PS1(i) output from the pixel signal reading unit RU1(i) through the vertical signal line.

Thereafter, in a period of time tR3 to time tR4, the vertical scanning circuit 323 outputs a reset voltage signal PR1(i) from the output terminal O1(i) to the pixel signal processing circuit 325 through the vertical signal line. In this way, the pixel signal processing circuit 325 takes a difference between the distance pixel voltage signal PS1(i) that is temporarily stored and the reset voltage signal PR1(i) output from the pixel signal reading unit RU1(i) through the vertical signal line, in other words, suppresses a noise included in a voltage signal corresponding to the amount of electric charge that is accumulated (added up) and stored in the electric charge accumulating unit CS1(i).

Thereafter, in a period of time tR4 to time tR7, similar to the period of the time tR1 to the time tR4, the vertical scanning circuit 323 outputs a distance pixel voltage signal PS2(i) and a reset voltage signal PR2(i) from an output terminal O2(i) to the pixel signal processing circuit 325 through a vertical signal line. In addition, also in a period of time tR7 to time tR10, similar to the period of the time tR1 to the time tR4, the vertical scanning circuit 323 outputs a distance pixel voltage signal PS3(i) and a reset voltage signal PR3(i) from an output terminal O3(i) to the pixel signal processing circuit 325 through a vertical signal line.

Thereafter, the vertical scanning circuit 323 sequentially performs driving of pixels 321 (hereinafter, referred to as "pixel signal reading driving") similar to the time tR1 to the time tR10 for pixels 321 disposed in another row (for example, pixels 321 disposed in the (i+1)-th row) of the light reception area 320 and sequentially outputs voltage signals from all the pixels 321 disposed within the light reception area 320.

In accordance with such a driving (controlling) method (timings), the vertical scanning circuit 323 performs distribution of electric charge generated and accumulated by the photoelectric conversion device PD in each of the pixels 321 disposed within the light reception area 320 to pixel signal reading units RU a plurality of times and outputs voltage signals corresponding to the amounts of electric charge accumulated (added up) in the electric charge accumulating units CS included in the pixel signal reading units RU to the pixel signal processing circuit 325 through the vertical signal line.

The pixel signal processing circuit 325 performs an A/D conversion process for each voltage signal of which noise is suppressed by each row. Then, the horizontal scanning circuit 324 sequentially outputs voltage signals of each row after the pixel signal processing circuit 325 performs the A/D conversion process through a horizontal signal line in order of columns of the light reception area 320. Thereby the distance image sensor 32 outputs pixel signals of all the pixels 321 corresponding to one frame to the outside. In this way, in the distance image capturing apparatus 1, pixel signals corresponding to one frame are output to the distance calculating unit 42 in order of raster.

As can be understood from the driving (controlling) timings of the pixels 321 illustrated in FIG. 4, three voltage signals corresponding to three pixel signal reading units RU (the electric charge accumulating units CS) included in a corresponding pixel 321 are included in each of pixel signals corresponding to one frame. The distance calculating unit 42 calculates a distance from a subject S for each pixel signal, in other words, for each pixel 321, on the basis of the pixel signals corresponding to one frame output from the distance image sensor 32.

A method of calculating a distance from a subject S using the distance calculating unit 42 will be described. Here, an amount of electric charge corresponding to background light before emission of a light pulse PO distributed to the electric charge accumulating unit CS1 of the pixel signal reading unit RU1 is assumed to be an amount of electric charge Q1. An amount of electric charge corresponding to background light distributed to the electric charge accumulating unit CS2 of the pixel signal reading unit RU2 and reflective light RL incident with a short delay time is assumed to be an amount of electric charge Q2. An amount of electric charge corresponding to background light distributed to the electric charge accumulating unit CS3 of the pixel signal reading unit RU3 and reflective light RL incident with a long delay time is assumed to be an amount of electric charge Q3. The distance calculating unit 42 acquires a distance D from a subject S for each pixel 321 using the following Equation (1).

$$D=(Q3-Q1)/(Q2+Q3-2Q1)\times Dm \quad (1)$$

In the aforementioned Equation (1), Dm represents a maximum distance that can be measured through emission of the light pulse PO (a maximum measurement distance). The maximum measurement distance Dm is represented using the following Equation (2).

$$Dm=(c/2)Tw \quad (2)$$

In the aforementioned Equation (2), "c" represents the velocity of light, and Tw represents a pulse width of a light pulse PO.

In this way, the distance D from the subject S can be acquired for each of the pixels 321 disposed within the light reception area 320 of the distance image sensor 32 in the distance image capturing apparatus 1.

As described above, the configuration of pixels disposed in the distance image sensor 32 is not limited to the configuration including three pixel signal reading units RU as illustrated in FIG. 3 and may be a configuration of pixels having one photoelectric conversion device PD and two or more pixel signal reading units RU for distributing electric charge generated and accumulated by the photoelectric conversion device PD. In such a case, in other words, also in a distance image sensor in which pixels including different numbers of pixel signal reading units RU are disposed, a method (timings) of driving (controlling) pixels can be easily realized by considering it to be similar to the method (timings) of driving (controlling) pixels 321 in the distance image capturing apparatus 1 illustrated in FIG. 4. More specifically, in a period in which a phase relation is maintained such that phases of drive signals input to a reading gate transistor G and a drain gate transistor GD included in each pixel signal reading unit RU do not overlap each other, by repeating electric charge distribution driving for pixels, similar to the distance image sensor 32, electric charge corresponding to corresponding light can be accumulated (added up) in the electric charge accumulating unit CS included in each pixel signal reading unit RU. Then, by sequentially outputting voltage signals from all the pixels through pixel signal reading driving, similar to the distance image sensor 32, pixel signals corresponding to one frame can be output to the outside of the distance image sensor. In this way, the distance calculating unit 42 can similarly acquire a distance D from a subject S for each pixel signal (for each pixel) on the basis of pixel signals corresponding to one frame output from a distance image sensor in which pixels configured to have different numbers of pixel signal reading units RU are disposed.

In the distance image capturing apparatus 1, in order to widen a dynamic range in the depth direction for measuring a distance D to a subject S, pixel signals of a plurality of frames for which the number of times of electric charge distribution driving are different are acquired as one set using the distance image sensor 32 included in the light receiving unit 3. In other words, in the distance image capturing apparatus 1, by setting the numbers of times of electric charge distribution driving to be different, pixel signals of a plurality of frames having different sensitivity levels are acquired as one set. For example, the distance image capturing apparatus 1 acquires pixel signals corresponding to two frames including a frame of a high-sensitivity pixel signal and a frame of a low-sensitivity pixel signal. Then, in the distance image capturing apparatus 1, by selecting one pixel signal among pixel signals corresponding to pixels 321 disposed at the same position included in pixel signals of a plurality of frames having different sensitivity levels, a so-called wide dynamic range for widening the range in the depth direction in which a distance D from a subject S can be acquired by the distance calculating unit 42 for each position of the pixel 321 and the range of background light of the subject S can be realized.

First Embodiment

Figure 5:
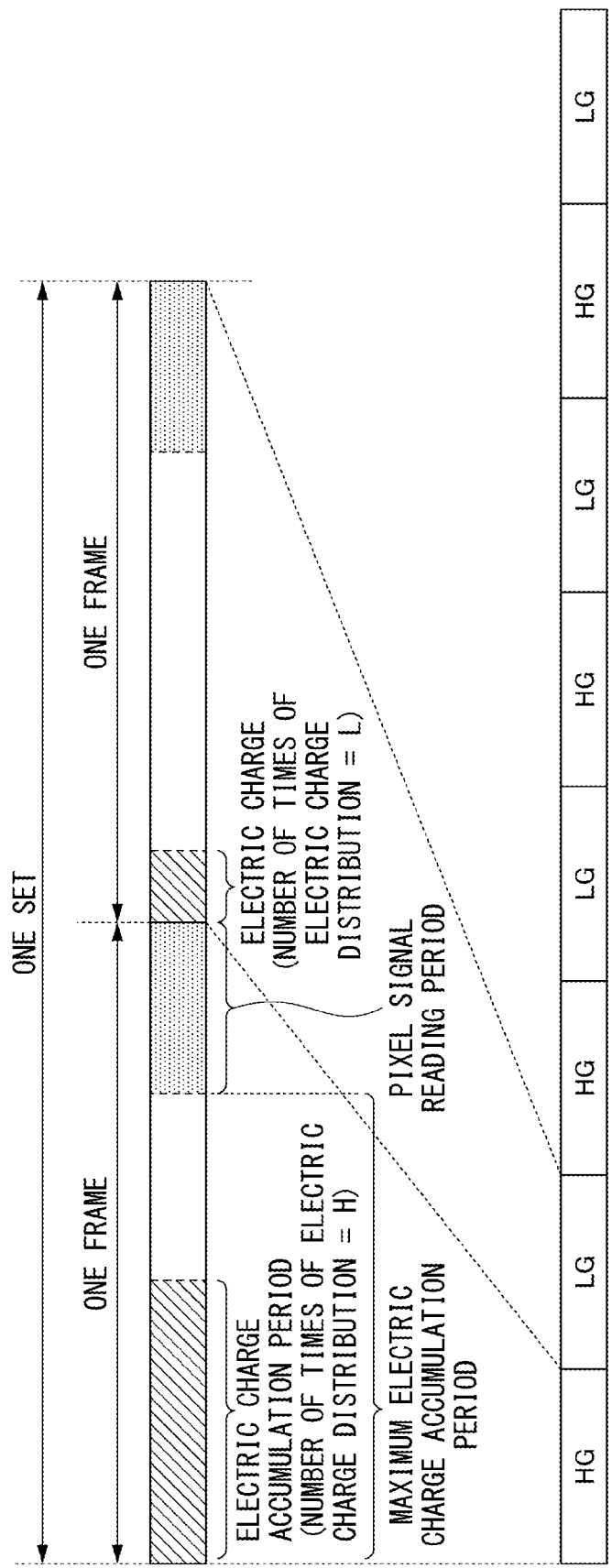
FIG. 5 is a diagram schematically illustrating one example of timings at which frames of a pixel signal used for measuring a distance are acquired in the distance image capturing apparatus.

Next, a method of realizing a wide dynamic range of a distance D to a subject S that can be measured by the distance image capturing apparatus 1 (first embodiment) will be described. FIG. 5 is a diagram schematically illustrating one example of timings at which frames of a pixel signal used for measuring a distance (distance D) are acquired in the distance image capturing apparatus 1.

The distance image capturing apparatus 1 acquires pixel signals of a plurality of frames having different sensitivity levels as one set, as a pixel signal for measuring a distance D from a subject S, in accordance with the number of times of electric charge distribution driving, in other words, the number of times which electric charge generated by the photoelectric conversion device PD through a photoelectric conversion is distributed and accumulated in the electric charge accumulating unit CS in each pixel 321. In the method of realizing a wide dynamic range according to the first embodiment, by setting two fixed numbers of times of electric charge distribution driving (hereinafter, referred to as "the number of times of electric charge distribution") in advance and configuring frames of two pixel signals acquired by performing electric charge distribution driving respective number of times of electric charge distribution set in advance as one set, a wide dynamic range for widening the range in the depth direction in which a distance D to the subject S can be measured by the distance image capturing apparatus 1 and the range of background light of the subject S is realized. FIG. 5 illustrates one example in a case in which one set of frames of pixel signals including a frame HG of a pixel signal having a high sensitivity level for which the number of times of electric charge distribution is large (hereinafter, referred to as a "high-sensitivity frame") set as a first frame and a frame LG of a pixel signal having a low sensitivity level for which the number of times of electric charge distribution is small (hereinafter, referred to as a "low-sensitivity frame") set as a second frame are acquired. As illustrated in FIG. 5, the distance image capturing apparatus 1 consecutively acquires a set of pixel signals corresponding to two frames including a high-sensitivity frame HG and a low-sensitivity frame LG. In other words, the distance image capturing apparatus 1 alternately and consecutively acquires a high-sensitivity frame HG and a low-sensitivity frame LG.

In FIG. 5, although one example of a case in which pixel signals corresponding to two frames are alternately acquired in order of a high-sensitivity frame HG and a low-sensitivity frame LG has been illustrated, the order of acquiring pixel signals corresponding two frames by the distance image capturing apparatus 1 is not limited to the order illustrated in FIG. 5. In other words, the distance image capturing apparatus 1 may alternately acquire pixel signals corresponding to two frames in order of a low-sensitivity frame LG and a high-sensitivity frame HG.

In addition, FIG. 5 schematically illustrates also a composition (ratio) of an electric charge accumulation period and a pixel signal reading period required when each of a high-sensitivity frame HG and a low-sensitivity frame LG is acquired. In a period of a pixel signal corresponding to one frame, the length of the pixel signal reading period is determined in accordance with a time required for reading each pixel signal from all the pixels 321 disposed within the light reception area 320 of the distance image sensor 32. In other words, in the period of a pixel signal corresponding to one frame, the length of the pixel signal reading period is determined in accordance with the number of pixels 321 disposed in the light reception area 320 of the distance image sensor 32, in other words, a pixel number. For this reason, a time that can be used as an electric charge accumulation period within the period of a pixel signal corresponding to one frame, in other words, the maximal length of the electric charge accumulation period (a maximum electric charge accumulation period) is a time acquired by subtracting the time of the pixel signal reading period from a time corresponding to one frame. The distance image capturing apparatus 1 performs electric charge distribution driving for acquiring a pixel signal corresponding to one frame within a time not exceeding the maximum electric charge accumulation period. For this reason, a maximal number of times with which electric charge distribution driving can be repeated for acquiring a pixel signal corresponding to one frame, in other words, a maximum number of times of electric charge distribution, as described above, equals a quotient acquired by dividing the maximum electric charge accumulation period by the pulse period time To of the light pulse PO.

In the distance image capturing apparatus 1, in accordance with control from the control circuit 322 or the distance image processing unit 4 (more specifically, the timing control unit 41), the vertical scanning circuit 323 performs electric charge distribution driving for acquiring a pixel signal corresponding to one frame within the time of the maximum electric charge accumulation period and accumulates (adds up) electric charge generated by the photoelectric conversion device PD through a photoelectric conversion in each electric charge accumulating unit CS within the pixel signal reading unit RU included in the pixel 321. At this time, the number of times of electric charge distribution driving performed by the vertical scanning circuit 323 is set as the number of times corresponding to a ratio between sensitivity levels of the high-sensitivity frame HG and the low-sensitivity frame LG. For example, in a case in which the sensitivity level of the high-sensitivity frame HG is set to be about ten times the sensitivity level of the low-sensitivity frame LG, the vertical scanning circuit 323 sets the number of times of electric charge distribution driving performed for acquiring a low-sensitivity frame LG to be about ⅒ of the number of times of electric charge distribution driving performed for acquiring a high-sensitivity frame HG. More specifically, in FIG. 5, for example, in a case in which the number of times of electric charge distribution driving (the number of times of electric charge distribution) performed for acquiring a high-sensitivity frame HG is H=100,000, the vertical scanning circuit 323 sets the number of times of electric charge distribution performed for acquiring a low-sensitivity frame LG to L=10,000.

In the distance image capturing apparatus 1, the distance calculating unit 42 calculates a distance D from a subject S for each position of the pixel 321 on the basis of frames of each set of pixel signals acquired at the timings illustrated in FIG. 5. At this time, the distance calculating unit 42 selects whether the distance D from the subject S is calculated on the basis of a pixel signal included in the high-sensitivity frame HG or the distance D from the subject S is calculated on the basis of a pixel signal included in the low-sensitivity frame LG for each pixel 321. More specifically, the distance calculating unit 42 selects whether the distance D from the subject S is calculated on the basis of an amount of electric charge Q represented by each of three voltage signals included as pixel signals in the high-sensitivity frame HG or the distance D from the subject S is calculated on the basis of an amount of electric charge Q represented by each of three voltage signals included as pixel signals in the low-sensitivity frame LG for each pixel 321. Then, the distance calculating unit 42 calculates the distance D from the subject S on the basis of the selected amount of electric charge Q for each pixel 321.

Figure 6:
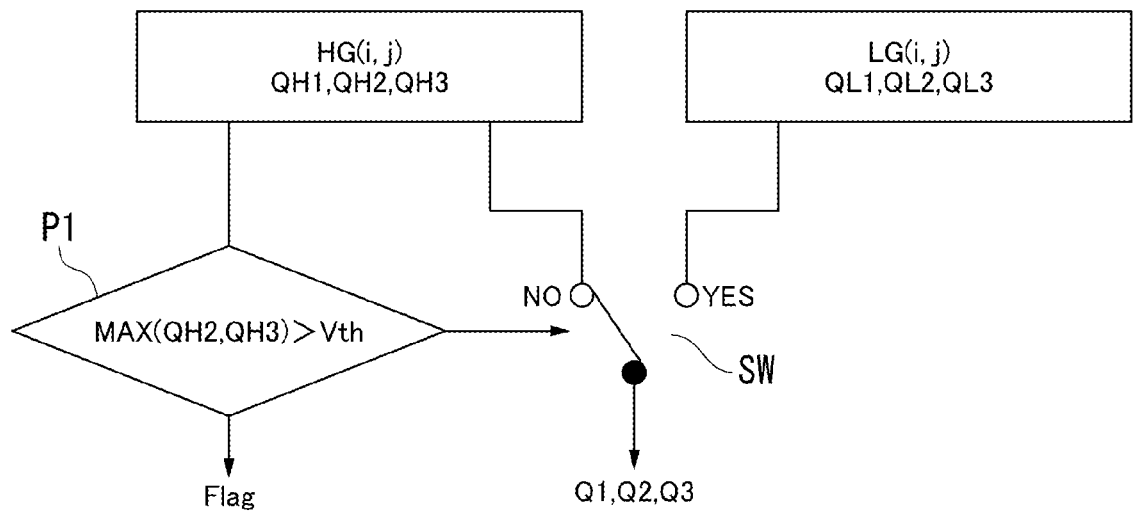
FIG. 6 is a diagram schematically illustrating a process of selecting a pixel signal used for measuring a distance in the distance image capturing apparatus.

Next, a process of selecting three amounts of electric charge Q used when the distance calculating unit 42 calculates the distance D from the subject S will be described. FIG. 6 is a diagram schematically illustrating a process of selecting a pixel signal (an amount of electric charge Q) used for measuring the distance D in the distance image capturing apparatus 1. FIG. 6 schematically illustrates a process of selecting a pixel signal used when the distance calculating unit 42 calculates the distance D from a position of one pixel 321 disposed in the i-th row ($1 \le i \le y$) and the j-th column ($1 \le j \le x$) in the light reception area 320 of the distance image sensor 32 to the subject S. In FIG. 6, the amount of electric charge Q represented by each of three voltage signals included in a high-sensitivity frame HG as pixel signals will be denoted by an "amount of electric charge QH", and the amount of electric charge Q represented by each of three voltage signals included in a low-sensitivity frame LG as pixel signals will be denoted by an "amount of electric charge QL".

As described above, the distance calculating unit 42 acquires the distance D from the subject S using the aforementioned Equation (1). Here, an amount of electric charge Q1 is the amount of electric charge corresponding to background light. An amount of electric charge Q2 is the amount of electric charge corresponding to background light and reflective light RL with a short delay time, in other words, reflective light reflected by a subject S present at a close position. An amount of electric charge Q3 is the amount of electric charge corresponding to background light and reflective light RL with a long delay time, in other words, reflective light reflected by a subject S present at a far position. For this reason, a relation among the amounts of electric charge Q becomes Q1<(Q2, Q3). A relation between the amount of electric charge Q2 and the amount of electric charge Q3 becomes Q2>Q3 in a pixel 321 that has received reflective light RL reflected by a subject S present at a close position and becomes Q2<Q3 in a pixel 321 that has received reflective light RL reflected by a subject S present at a far position.

In an electric charge amount determining process P1, the distance calculating unit 42 selects a pixel signal of one of a high-sensitivity frame HG and a low-sensitivity frame LG as a pixel signal used when the distance D from the subject S is calculated on the basis of the amount of electric charge QH2 and the amount of electric charge QH3 in which the amount of electric charge corresponding to the reflective light RL reflected by the subject S is included, among the amount of electric charge QH1, the amount of electric charge QH2, and the amount of electric charge QH3 represented by three voltage signals included in the high-sensitivity frame HG as pixel signals. More specifically, the distance calculating unit 42 selects electric charge QH having a larger amount by performing a process of MAX (QH2, QH3) using a pixel signal of a high-sensitivity frame HG and compares the selected amount of electric charge QH with a reference threshold used for selecting a pixel signal. In FIG. 6, the reference threshold to be compared with the selected amount of electric charge QH in the electric charge amount determining process P1 is represented using the magnitude (a voltage value V) of a pixel signal that is a voltage signal corresponding to the amount of electric charge Q and is set as a threshold Vth. In a case in which the selected amount of electric charge QH is equal to or smaller than the threshold Vth (in a case in which a determination result of the electric charge amount determining process P1 is "NO"), the distance calculating unit 42 sets a flag signal Flag representing the determination result as Flag=0, sets a changeover switch SW to the "NO" side, and selects a pixel signal of the high-sensitivity frame HG as a pixel signal used when the distance D from the subject S is calculated. On the other hand, in a case in which the selected amount of electric charge QH exceeds the threshold Vth (in a case in which a determination result of the electric charge amount determining process P1 is "YES"), the distance calculating unit 42 sets the flag signal Flag as Flag=1, sets the changeover switch SW to the "YES" side, and selects a pixel signal of the low-sensitivity frame LG as a pixel signal used when the distance D from the subject S is calculated.

Figure 7:
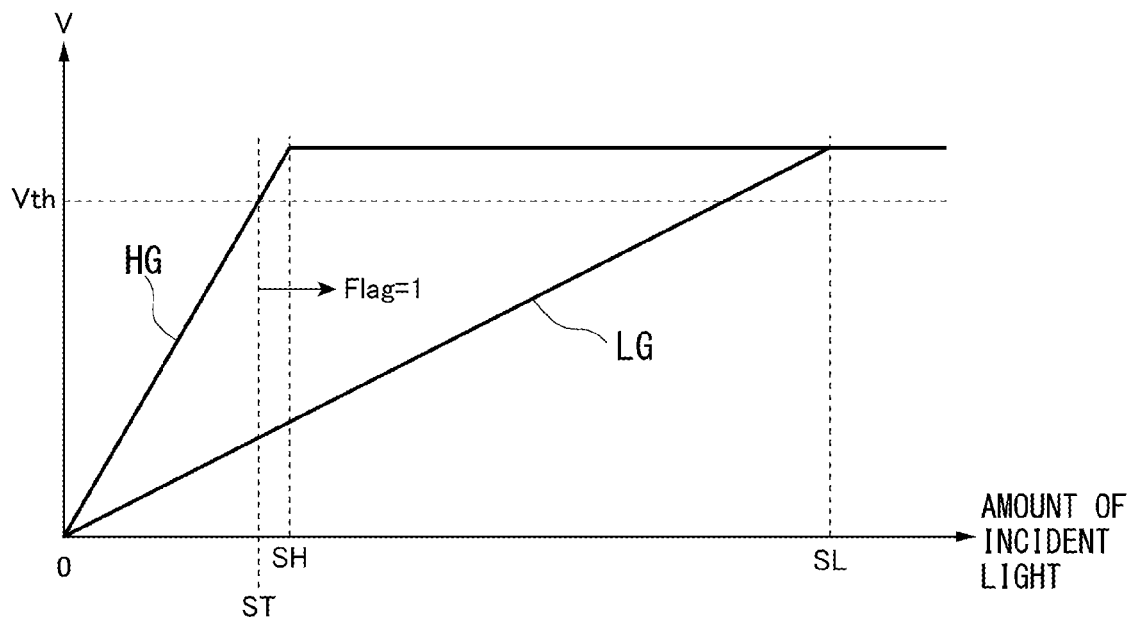
FIG. 7 is a diagram illustrating one example of a relation of a process of selecting a pixel signal used for measuring a distance in the distance image capturing apparatus.

A relation between a pixel signal selected by the distance calculating unit 42 and the threshold Vth will be described. FIG. 7 is a diagram illustrating one example of a relation of a process of selecting a pixel signal used for measuring the distance D (the electric charge amount determining process P1) in the distance image capturing apparatus 1. In FIG. 7, the horizontal axis represents an amount of incident light, the vertical axis represents the magnitude (a voltage value V) of a pixel signal, in other words, a voltage signal corresponding to the amount of electric charge Q distributed to the electric charge accumulating unit CS, and linear characteristics and saturation characteristic of the pixel signal in a case in which the pixel 321 receives reflective light RL having the same amount of light are illustrated. In addition, the threshold Vth is illustrated in FIG. 7.

Every pixel signal included in the high-sensitivity frame HG and the low-sensitivity frame LG, the magnitude of the voltage signal becomes larger as the amount of the reflective light RL received by the pixel 321 increases. However, in a case in which the pixel 321 receives reflective light RL having the same amount of light, a voltage signal is saturated earlier in a pixel signal of the high-sensitivity frame HG whose number of times of electric charge distribution is larger, than in a pixel signal of the low-sensitivity frame LG whose number of times of electric charge distribution is smaller. FIG. 7 illustrates characteristics in which a pixel signal of a high-sensitivity frame HG is saturated at incident light amount SH, and a low-sensitivity frame LG is saturated at incident light amount SL.

For this reason, in the electric charge amount determining process P1 performed in the distance calculating unit 42, as described above, the magnitude (a voltage value V) of the pixel signal of the high-sensitivity frame HG is compared with the threshold Vth, and one of the pixel signal of the high-sensitivity frame HG and the pixel signal of the low-sensitivity frame LG is selected as a pixel signal used for calculation of the distance D from the subject S on the basis of whether or not the magnitude of the pixel signal exceeds the threshold Vth. In FIG. 7, the magnitude (the voltage value V) of the pixel signal of the high-sensitivity frame HG exceeds the threshold Vth at incident light amount ST, and accordingly, the flag signal Flag is set as Flag=1 at this point, and the pixel signal of the low-sensitivity frame LG is selected as a pixel signal used when the distance D from the subject S is calculated. Before the incident light amount becomes ST, the flag signal Flag is set as Flag=0, and the pixel signal of the high-sensitivity frame HG is selected as a pixel signal used when the distance D from the subject S is calculated.

In this way, the distance calculating unit 42 can calculate the distance D from the subject S by switching the pixel signal to one of the low-sensitivity frame LG before the magnitude (the voltage value V) of the pixel signal is saturated. Because saturation resistance of the low-sensitivity frame LG is improved up to the incident light amount SL by decreasing the number of times of electric charge distribution.

The threshold Vth used in the electric charge amount determining process P1 by the distance calculating unit 42 is a value that defines a ratio (for example, 90%) set in advance for the amount of electric charge Q for which the electric charge accumulating unit CS included in the pixel 321 disposed in the distance image sensor 32 is saturated. The threshold Vth, for example, may be determined on the basis of manufacturing conditions of the distance image sensor 32 (more specifically, the pixel 321) or the like, and may set the determined value in the distance calculating unit 42 in advance. For example, the threshold Vth may be determined on the basis of arbitrary conditions such as a state of a subject S that is a target for the distance image capturing apparatus 1 to measure the distance D, a measurement mode when the distance image capturing apparatus 1 measures the distance D from the subject S, and the like, and the determined value may be set by a control unit included in the distance image processing unit 4 or provided inside or outside the distance image capturing apparatus 1, which are not illustrated in the drawing, before the distance calculating unit 42 calculates the distance D from the subject S. In other words, the threshold Vth may be a changeable value that can be changed on the basis of arbitrary conditions of states of the subject S such as a position of the subject S, an environment of a background in which the subject vehicle S is present, reflectivity of the subject S for the light pulse PO, and the like and a mode (for example, a short distance measurement mode, a long distance measurement mode, or the like) for switching a range of the distance D to be measured by the distance image capturing apparatus 1. In such a case, in the distance image capturing apparatus 1, the threshold Vth can be changed to an appropriate value even in a case in which the subject vehicle S is present at a close position or is present at a far position, there is an environment in which strong background light is incident in accordance with a bright surrounding environment of the subject S, there is an environment in which background light is not incident in accordance with a dark surrounding environment, the subject S has high reflectivity for the light pulse PO, or the subject S has low reflectivity.

In this way, the distance calculating unit 42 selects one pixel signal among pixel signals corresponding to the pixel 321 disposed at the same position included in two frames having different sensitivity levels as a pixel signal used for calculating the distance D from the subject S. Thereafter, the distance calculating unit 42 applies the amounts of electric charges Q (the amounts of electric charge Q1, Q2, and Q3) represented by three voltage signals included in the selected pixel signal to the Equation (1) described above, thereby calculating the distance D from the subject S.

Then, the distance calculating unit 42 associates the acquired distance D and the flag signal Flag with each other to acquire distance information corresponding to the position of the pixel 321. In this way, it can be easily determined whether the distance D included in the distance information output by the distance calculating unit 42 has been acquired using the pixel signal of the high-sensitivity frame HG or the pixel signal of the low-sensitivity frame LG by referring to the flag signal Flag. Thereafter, the distance calculating unit 42, similarly, repeats selection of a pixel signal according to the electric charge amount determining process P1 and calculation of the distance D based on the selected pixel signal for each pixel 321 disposed within the light reception area 320 of the distance image sensor 32. In this way, the distance calculating unit 42 outputs distance information corresponding to one frame that corresponds to the positions of all the pixels 321.

In the present invention, the configuration of the distance calculating unit 42 for performing the electric charge amount determining process P1 is not particularly limited. For example, the distance calculating unit 42 may have a configuration including two frame memories including a frame memory temporarily storing an acquired pixel signal of the high-sensitivity frame HG and a frame memory temporarily storing an acquired pixel signal of the low-sensitivity frame LG. In such a configuration, the distance calculating unit 42 performs selection of a pixel signal according to the electric charge amount determining process P1 and calculation of the distance D based on the selected pixel signal while reading a pixel signal corresponding to the same pixel 321 that has been stored in each frame memory. In addition, the distance calculating unit 42 may have a configuration including one frame memory temporarily storing an acquired pixel signal of the low-sensitivity frame LG. In such a configuration, the distance calculating unit 42 acquires a set of pixel signals corresponding to two frames in order of the low-sensitivity frame LG and the high-sensitivity frame HG and stores the acquired pixel signal of the low-sensitivity frame LG in the frame memory. Then, when a pixel signal of the high-sensitivity frame HG is acquired, the distance calculating unit 42 reads a pixel signal of the low-sensitivity frame LG corresponding to the same pixel 321 stored in the frame memory and performs the electric charge amount determining process P1 and the calculation of a distance D for the pixel signal of the high-sensitivity frame HG that is currently acquired and the pixel signal of the low-sensitivity frame LG read from the frame memory. In other words, the distance calculating unit 42 performs the electric charge amount determining process P1 and the calculation of the distance D in synchronization with a timing at which the pixel signal of the high sensitivity frame HG is acquired.

Figure 8:
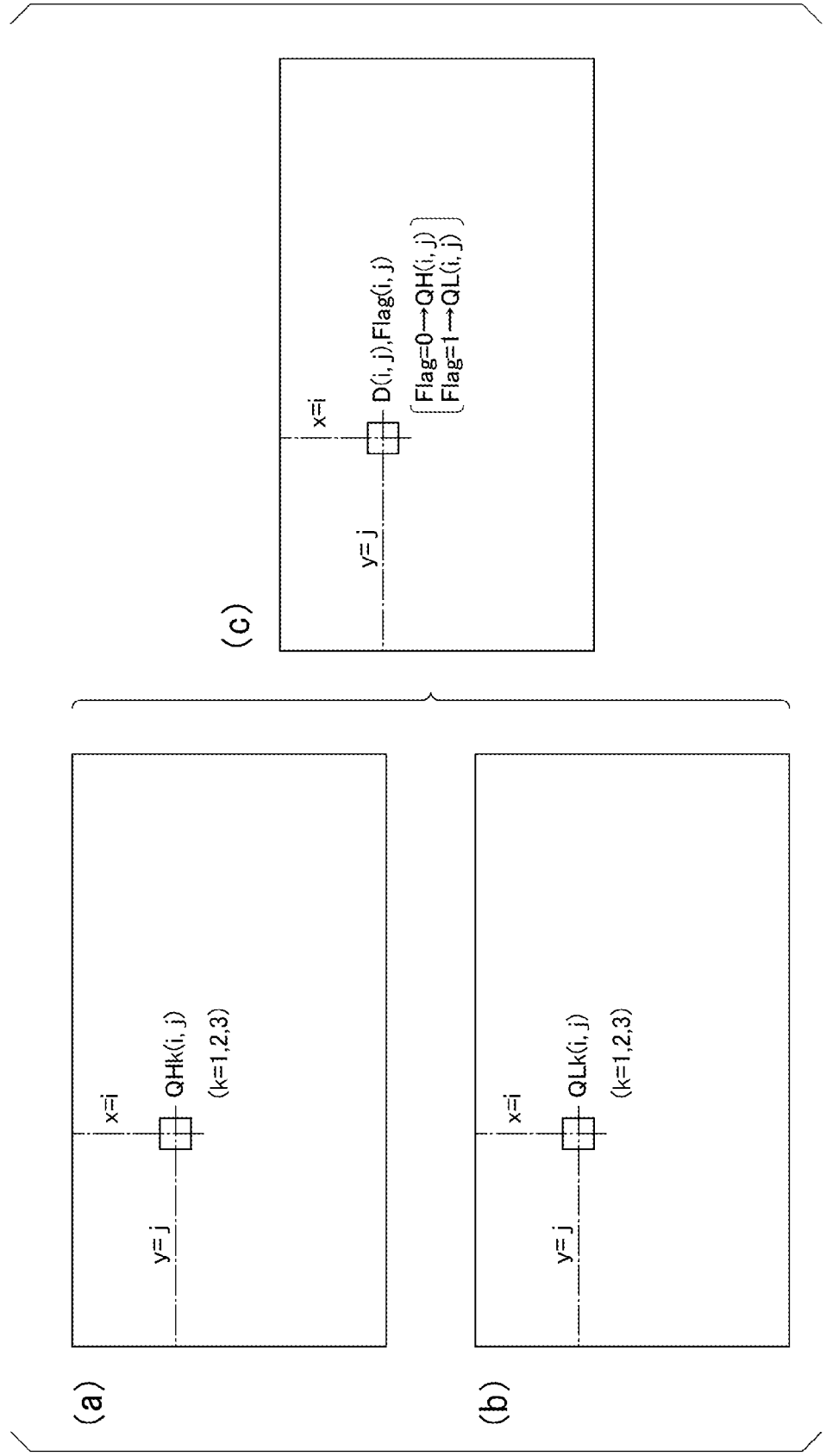
FIG. 8 is a diagram schematically illustrating one example of the configurations of frames in which information of a distance measured in the distance image capturing apparatus is included.

The configuration of distance information corresponding to one frame will be described. FIG. 8 is a diagram schematically illustrating one example of the configurations of frames in which information of a distance (distance information) is included in the distance image capturing apparatus 1. (a) of FIG. 8 illustrates one example of the configuration of a high-sensitivity frame HG. (b) of FIG. 8 illustrates one example of the configuration of a low-sensitivity frame LG. (c) of FIG. 8 illustrates one example of a frame of distance information.

As described above, the distance calculating unit 42 acquires a set of pixel signals corresponding to two frames including a high-sensitivity frame HG and a low-sensitivity frame LG and outputs distance information in which the distance D acquired by selecting one pixel signal for each pixel 321 and a flag signal Flag are associated with each other. FIG. 8 illustrates one example of a frame in which distance information corresponding to the position of one pixel 321 disposed in the i-th row ($1 \leq i \leq y$) and the j-th column ($1 \leq j \leq x$) of the light reception area 320 of the distance image sensor 32 is included in each frame.

The distance calculating unit 42 selects one amount of electric charge Q of the amount of electric charge QHk(i, j) (k=1, 2, 3) included in the high-sensitivity frame HG illustrated in (a) of FIG. 8 as a pixel signal and the amount of electric charge QLk(i, j) (k=1, 2, 3) included in the low-sensitivity frame LG illustrated in (b) of FIG. 8 as a pixel signal in the electric charge amount determining process P1, and calculates the distance D from the subject S by applying the selected amount of electric charge Q to the Equation (1). Then, as illustrated in (c) of FIG. 8, the distance calculating unit 42 outputs a frame of the distance information in which a calculated distance D(i, j) and a flag signal Flag(i, j) are associated with each other. As described above, even if the distance calculating unit 42 has a configuration including one frame memory, it also can perform a similar process of outputting the frame of the distance information illustrated in (c) of FIG. 8 using only this one frame memory.

In the description presented above, a case in which the distance calculating unit 42 repeats the selection of a pixel signal according to the electric charge amount determining process P1 and the calculation of the distance D based on the selected pixel signal for each pixel 321 disposed within the light reception area 320 of the distance image sensor 32 on the basis of pixel signals corresponding to one frame of each of the high-sensitivity frame HG and the low-sensitivity frame LG has been described. However, the electric charge amount determining process P1 and the calculation of a distance D in the distance calculating unit 42 are not limited to be configured to be performed for each pixel 321. For example, the distance calculating unit 42 may be configured to perform the electric charge amount determining process P1 and the calculation of a distance D for every block acquired by dividing the light reception area 320 of the distance image sensor 32 among predetermined units of a plurality of pixels 321 adjacent in the horizontal direction (row direction) and the vertical direction (column direction) such as every two pixels 321 (2×2 pixels), four pixels 321 (4×4 pixels), or the like.

Thereafter, the distance calculating unit 42 may generate a distance information image that visually represents distance information corresponding to one frame. In addition, the distance calculating unit 42 may generate a brightness image illuminated by light PO corresponding to a distance information image in which the shape of the subject S included within a measurement range of the distance D in the distance image capturing apparatus 1, in other words, within the imaging area of the distance image sensor 32 is visually represented using brightness and darkness. Here, the brightness image is an image in which the amount of reflective light RL received by each pixel 321 is represented using brightness and darkness and accordingly, depends on the sensitivity of a pixel signal, in other words, the absolute value of the amount of electric charge Q. In the distance information corresponding to one frame that is output by the distance calculating unit 42, the distance D acquired using a pixel signal of the high-sensitivity frame HG and the distance D acquired using a pixel signal of the low-sensitivity frame LG are mixed. In this case, if a brightness image corresponding to a distance information image is simply generated, the brightness/darkness in the pixels 321 is not uniform, and a strange brightness image is formed. For this reason, the distance calculating unit 42 generates a brightness image by performing gain adjustment such that brightness/darkness of the same position becomes the same between the pixel signal of the high-sensitivity frame HG and the pixel signal of the low-sensitivity frame LG by referring to a flag signal Flag associated with the distance D in the distance information corresponding to one frame. The distance calculating unit 42 may generate a brightness image on the basis of a pixel signal of the high-sensitivity frame HG when only a flag signal Flag of Flag=0 is included in the distance information corresponding to one frame and generate a brightness image on the basis of a pixel signal of the low-sensitivity frame LG when two flag signals Flag of Flag=0 and Flag=1 are included.

As described above, in the first embodiment, the distance calculating unit 42 selects one of pixel signals corresponding to a pixel 321 at the same position included in pixel signals of two frames having different sensitivity levels as a pixel signal used for calculating a distance D from the subject S in the electric charge amount determining process P1. Thereafter, the distance calculating unit 42 calculates the distance D from the subject S by applying the amounts of electric charge Q (the amount of electric charge Q1, the amount of electric charge Q2, and the amount of electric charge Q3) represented by three voltage signals included in the selected pixel signal to the Equation (1). In this way, in the first embodiment, the distance calculating unit 42 can acquire the distance D with a high sensitivity level in a case in which the magnitude of the pixel signal is smaller than the threshold Vth and can acquire a distance D with high saturation resistance in a case in which the magnitude of the pixel signal exceeds the threshold Vth. Accordingly, in the first embodiment, a wide dynamic range of the distance D acquired by the distance calculating unit 42 can be also achieved. In other words, according to the first embodiment, the range in the depth direction in which the distance D from the subject S can be measured by the distance image capturing apparatus 1 and the range of background light of the subject S can be widened.

Second Embodiment

Figure 9:
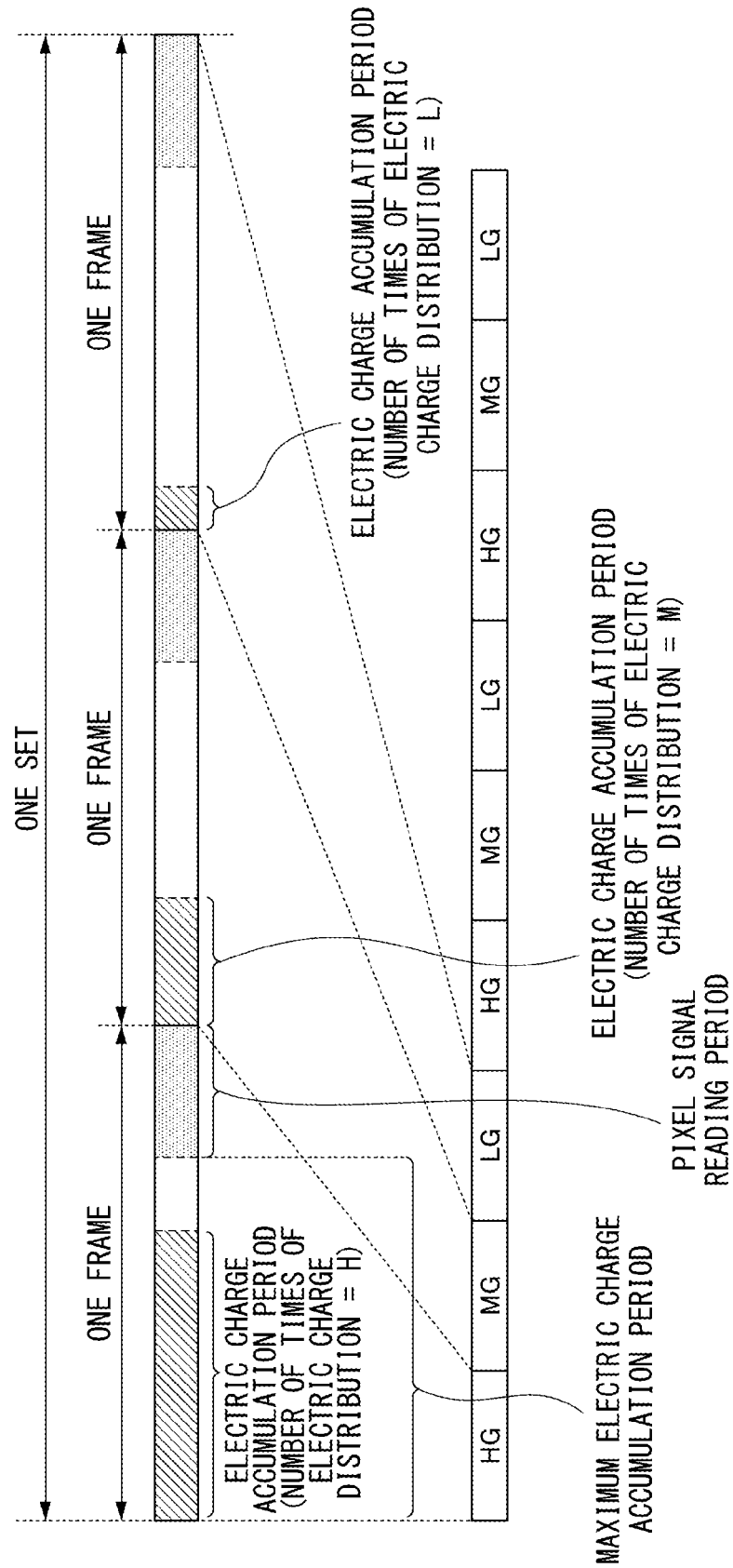
FIG. 9 is a diagram schematically illustrating another example of timings at which frames of pixel signals used for measuring a distance are acquired in the distance image capturing apparatus.

Next, another method (second embodiment) for realizing a wide dynamic range of a distance D from a subject S that can be measured by the distance image capturing apparatus 1 will be described. FIG. 9 is a diagram schematically illustrating another example of timings at which frames of pixel signals used for measuring the distance D in the distance image capturing apparatus 1. In the method of realizing a wide dynamic range according to the second embodiment, by setting a three fixed numbers of times of electric charge distribution in advance and configuring frames of three pixel signals acquired in each number of times of electric charge distribution set in advance as one set, a wide dynamic range for widening the range in the depth direction in which a distance D to the subject S can be measured by the distance image capturing apparatus 1 and the range of background light of the subject S is realized. FIG. 9 illustrates one example in a case in which frames of three pixel signals for which the number of times of electric charge distribution are different from each other are acquired as one set by the distance image capturing apparatus 1. More specifically, FIG. 9 illustrates one example in a case in which frames of one set of pixel signals including a high-sensitivity frame HG, for which the number of times of electric charge distribution is large, set as a first frame, a frame (hereinafter, referred to as an "intermediate sensitivity frame") MG of a pixel signal having an intermediate-sensitivity level, for which the number of times of electric charge distribution is in an intermediate, set as a second frame, and a low-sensitivity frame LG, for which the number of times of electric charge distribution is small, set as a third frame are acquired. As illustrated in FIG. 9, the distance image capturing apparatus 1 consecutively acquires pixel signals of three frames including a high-sensitivity frame HG, an intermediate-sensitivity frame MG, and a low-sensitivity frame LG alternately.

Although one example in a case in which pixel signals corresponding to three frames are alternately acquired in order of the high-sensitivity frame HG, the intermediate-sensitivity frame MG, and the low-sensitivity frame LG is illustrated in FIG. 9, the order in which the distance image capturing apparatus 1 acquires pixel signals corresponding to three frames is not limited to the order illustrated in FIG. 9, and any order may be used as long as the order of frames for each set is not changed. For example, the order may be in order of the low-sensitivity frame LG, the intermediate-sensitivity frame MG, and the high-sensitivity frame HG or in order of the high-sensitivity frame HG, the low-sensitivity frame LG, and the intermediate-sensitivity frame MG.

In addition, a composition (ratio) of an electric charge accumulation period and a pixel signal reading period required when each of the high-sensitivity frame HG, the intermediate-sensitivity frame MG, and the low-sensitivity frame LG is acquired are also schematically illustrated in FIG. 9. The thought of the composition (ratio) of the electric charge accumulation period and the pixel signal reading period is similar to that of the composition (ratio) of the electric charge accumulation period and the pixel signal reading period illustrated in FIG. 5 in the first embodiment. For this reason, detailed description of the composition (ratio) of the electric charge accumulation period and the pixel signal reading period required when each frame illustrated in FIG. 9 is acquired will be omitted.

In the method of realizing a wide dynamic range according to the second embodiment, for example, in a case in which the sensitivity level of the high-sensitivity frame HG is set to about ten times the sensitivity level of the low-sensitivity frame LG, and the sensitivity level of the intermediate-sensitivity frame MG is set to about five times the sensitivity level of the low-sensitivity frame LG, the vertical scanning circuit 323 sets the number of times of electric charge distribution performed for acquiring the intermediate-sensitivity frame MG to about ½ of the number of times of electric charge distribution performed for acquiring the high-sensitivity frame HG and sets the number of times of electric charge distribution performed for acquiring the low-sensitivity frame LG to about 1/10 of the number of times of electric charge distribution performed for acquiring the high-sensitivity frame HG. More specifically, in FIG. 9, for example, in a case in which the number of times of electric charge distribution performed for acquiring the high-sensitivity frame HG is set as H=100,000, the vertical scanning circuit 323 sets the number of times of electric charge distribution performed for acquiring the intermediate-sensitivity frame MG to M=50,000, and the number of times of electric charge distribution performed for acquiring the low-sensitivity frame LG to L=10,000.

Also in the method of realizing a wide dynamic range according to the second embodiment, according to a thought similar to that of the method of realizing a wide dynamic range according to the first embodiment, the distance calculating unit 42 of the distance image capturing apparatus 1 calculates the distance D from a subject S for each position of the pixel 321 on the basis of frames of each set of pixel signals acquired at the timings illustrated in FIG. 9. At this time, the distance calculating unit 42 selects whether the distance D from the subject S is calculated on the basis of a pixel signal included in the high-sensitivity frame HG or on the basis of a pixel signal included in the intermediate-sensitivity frame MG or the low-sensitivity frame LG for each pixel 321. In a case in which a pixel signal of the intermediate-sensitivity frame MG or the low-sensitivity frame LG is selected, the distance calculating unit 42 selects whether the distance D from a subject S is calculated on the basis of the pixel signal included in the intermediate-sensitivity frame MG or on the basis of the pixel signal included in the low-sensitivity frame LG, on the basis of the pixel signal of the position of a pixel 321 included in the intermediate-sensitivity frame MG for each pixel 321. Then, the distance calculating unit 42 calculates the distance D from the subject S for each pixel 321 on the basis of the selected amount of electric charge Q.

Figure 10:
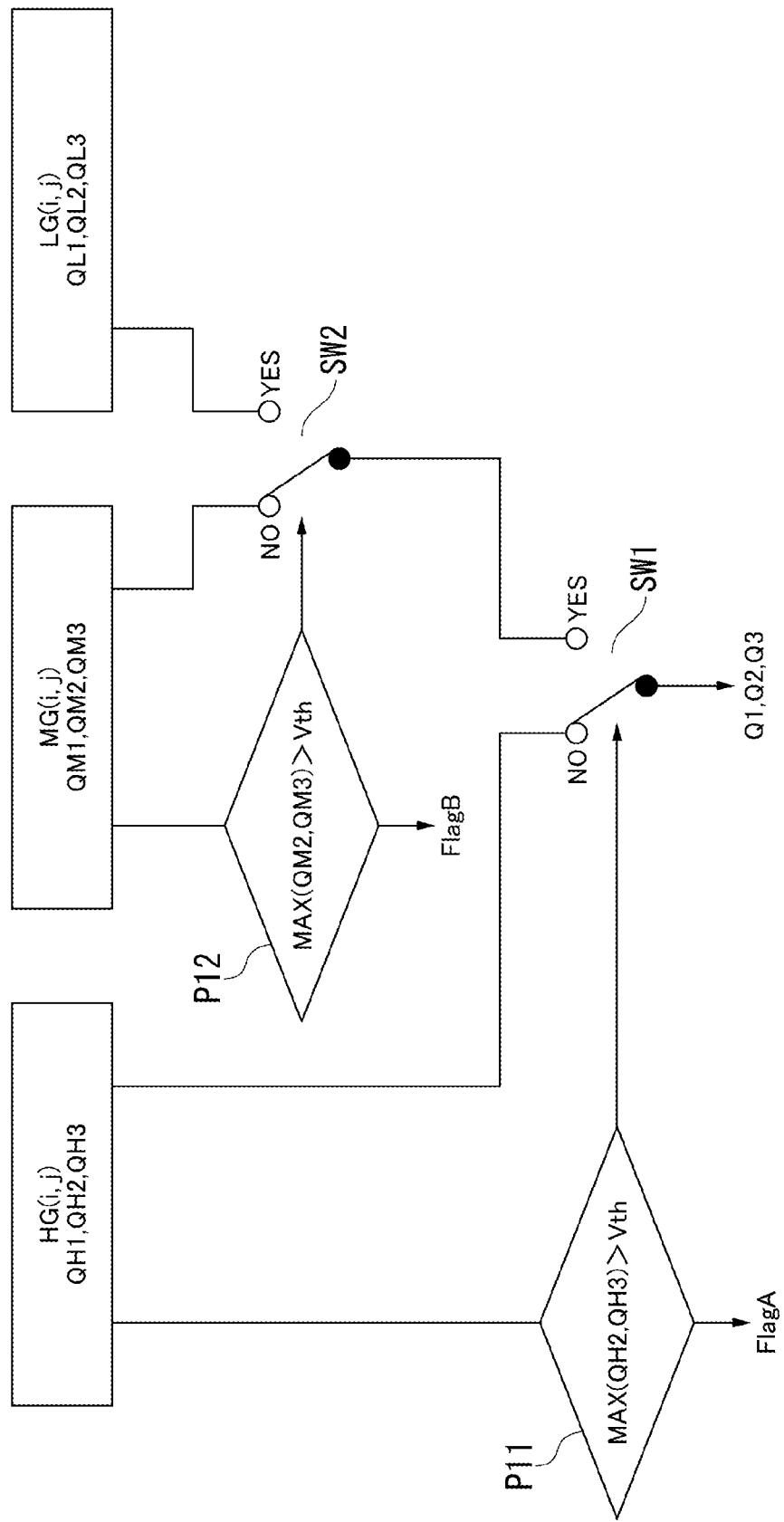
FIG. 10 is a diagram schematically illustrating another process of selecting a pixel signal used for measuring a distance in the distance image capturing apparatus.

Next, a process of selecting three amounts of electric charge Q used when the distance calculating unit 42 calculates the distance D from the subject S will be described. FIG. 10 is a diagram schematically illustrating another process of selecting a pixel signal (an amount of electric charge Q) used for measuring the distance D in the distance image capturing apparatus 1. FIG. 10 schematically illustrates a process of selecting a pixel signal used when the distance calculating unit 42 calculates the distance D from the position of one pixel 321 disposed in the i-th row ($1 \le i \le y$) and the j-th column ($1 \le j \le x$) to the subject S in the light reception area 320 of the distance image sensor 32. In FIG. 10, the amount of electric charge Q represented by each of three voltage signals included in a high-sensitivity frame HG as pixel signals will be denoted by an "amount of electric charge QH", the amount of electric charge Q represented by each of three voltage signals included in an intermediate-sensitivity frame MG as pixel signals will be denoted by an "amount of electric charge QM", and the amount of electric charge Q represented by each of three voltage signals included in a low-sensitivity frame LG as pixel signals will be denoted by an "amount of electric charge QL".

Also in the method of realizing a wide dynamic range according to the second embodiment, similar to the method of realizing a wide dynamic range according to the first embodiment, the distance calculating unit 42 acquires the distance D from the subject S using the Equation (1). Here, the amount of electric charge Q1, the amount of electric charge Q2, and the amount of electric charge Q3, and a relation among the amounts of electric charge Q are similar to those according to the method of realizing a wide dynamic range of the first embodiment. In other words, a relation among the amounts of electric charge Q becomes Q1<(Q2, Q3), a relation between the amount of electric charge Q2 and the amount of electric charge Q3 becomes Q2>Q3 in a pixel 321 that has received reflective light RL reflected by a subject S present at a close position and becomes Q2<Q3 in a pixel 321 that has received reflective light RL reflected by a subject S present at a far position.

In an electric charge amount determining process P11, similar to the electric charge amount determining process P1 according to the method of realizing a wide dynamic range according to the first embodiment, the distance calculating unit 42 selects a pixel signal of one of a high-sensitivity frame HG, an intermediate-sensitivity frame MG, and a low-sensitivity frame LG as a pixel signal used for calculation of the distance D from the subject S on the basis of the amount of electric charge QH2 and the amount of electric charge QH3 of the high-sensitivity frame HG. Then, in a case in which a pixel signal of one of the intermediate-sensitivity frame MG and the low-sensitivity frame LG is selected as a pixel signal used for calculation of the distance D from the subject S, in an electric charge amount determining process P12, the distance calculating unit 42 selects a pixel signal of one of the intermediate-sensitivity frame MG and the low-sensitivity frame LG as a pixel signal used for calculation of the distance D from the subject S on the basis of the amount of electric charge QM2 and the amount of electric charge QM3 in which an amount of electric charge corresponding to reflective light RL reflected by the subject S among the amounts of electric charge QM1, QM2, and the QM3 represented by three voltage signals included in the intermediate-sensitivity frame MG as a pixel signal.

More specifically, the distance calculating unit 42, first, selects a larger amount of electric charge QH through a process of MAX(QH2, QH3) using a pixel signal of the high-sensitivity frame HG and compares the selected amount of electric charge QH with a threshold Vth that is a criterion used for selecting a pixel signal. In a case in which the selected amount of electric charge QH is equal to or smaller than the threshold Vth (in a case in which a determination result of the electric charge amount determining process P11 is "NO"), the distance calculating unit 42 sets a flag signal FlagA representing the determination result as FlagA=0, sets a changeover switch SW1 to the "NO" side, and selects a pixel signal of the high-sensitivity frame HG as a pixel signal used for calculation of the distance D from the subject S. On the other hand, in a case in which the selected amount of electric charge QH exceeds the threshold Vth (in a case in which a determination result of the electric charge amount determining process P11 is "YES"), the distance calculating unit 42 sets the flag signal FlagA representing the determination result as FlagA=1, sets the changeover switch SW1 to the "YES" side, and performs the next determination process, in other words, the electric charge amount determining process P12. In the electric charge amount determining process P12, the distance calculating unit 42 selects a larger amount of electric charge QM through a process of MAX(QM2, QM3) using the pixel signal of the intermediate-sensitivity frame MG and compares the selected amount of electric charge QM with the threshold Vth. Then, in a case in which the selected amount of electric charge QM is equal to or smaller than the threshold Vth (in a case in which the determination result of the electric charge amount determining process P12 is "NO"), the distance calculating unit 42 sets the flag signal FlagB representing the determination result as FlagB=0, sets the changeover switch SW2 to the "NO" side, and selects a pixel signal of the intermediate-sensitivity frame MG as a pixel signal used for calculation of the distance D from the subject S. On the other hand, in a case in which the selected amount of electric charge QM exceeds the threshold Vth (in a case in which a determination result of the electric charge amount determining process P12 is "YES"), the distance calculating unit 42 sets the flag signal FlagB representing the determination result as FlagB=1, sets the changeover switch SW2 to the "YES" side, and selects a pixel signal of the low-sensitivity frame LG as a pixel signal used for calculation of the distance D from the subject S.

In the description presented above, although a case in which the electric charge amount determining process P12 is performed following the electric charge amount determining process P11 has been described, the order in which the electric charge amount determining process P11 and the electric charge amount determining process P12 are performed is not limited to the aforementioned order. In other words, the electric charge amount determining process P11 may be performed after the electric charge amount determining process P12.

Figure 11:
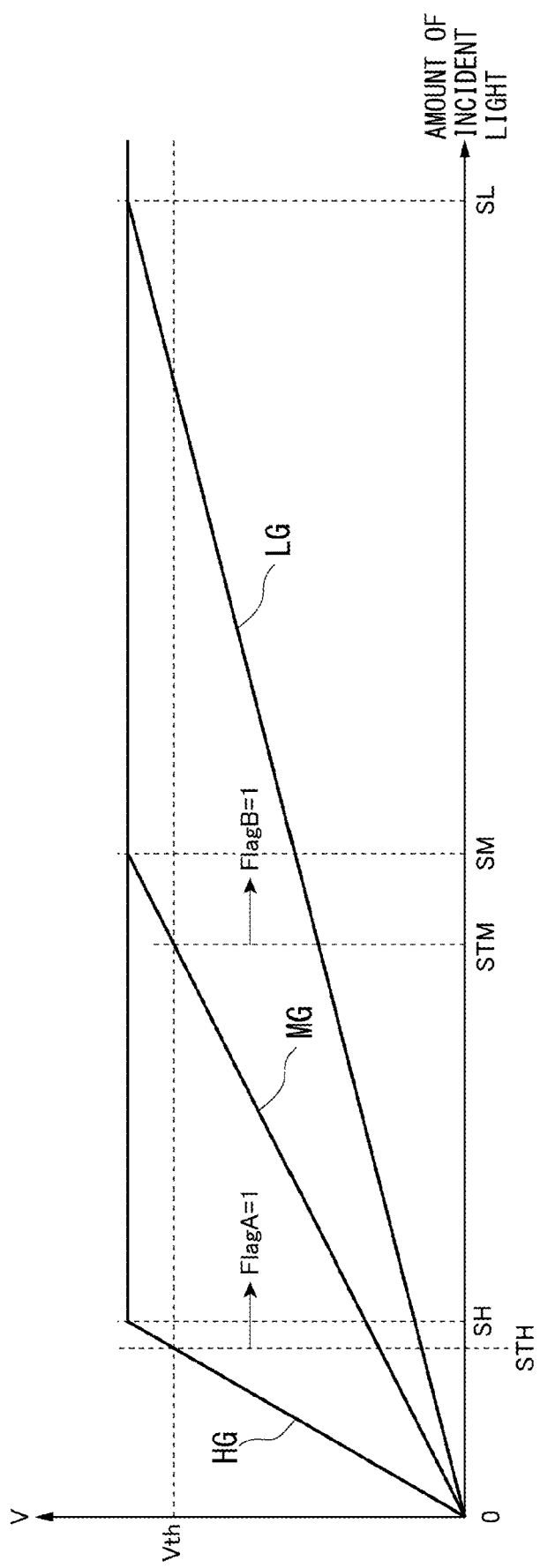
FIG. 11 is a diagram illustrating one example of a relation of another process of selecting a pixel signal used for measuring a distance in the distance image capturing apparatus.

A relation between a pixel signal selected by the distance calculating unit 42 and the threshold Vth will be described. FIG. 11 is a diagram illustrating one example of a relation between the other processes (the electric charge amount determining process P11 and the electric charge amount determining process P12) for selecting a pixel signal used for measuring the distance D in the distance image capturing apparatus 1. In FIG. 11, similar to one example of the relation of the process of selecting a pixel signal used for measuring a distance according to the first embodiment illustrated in FIG. 7 (the electric charge amount determining process P1), the horizontal axis represents an amount of incident light, the vertical axis represents the magnitude (a voltage value V) of a pixel signal, in other words, a voltage signal corresponding to the amount of electric charge Q distributed to the electric charge accumulating unit CS, and linear characteristics and saturation characteristic of the pixel signal when the pixel 321 receives reflective light RL having the same amount of light are illustrated. In FIG. 11, similar to one example of the relation of the process of selecting a pixel signal used for measuring a distance according to the first embodiment illustrated in FIG. 7 (the electric charge amount determining process P1), a threshold Vth is also illustrated.

Every pixel signal included in any of the high-sensitivity frame HG, the intermediate-sensitivity frame MG, and the low-sensitivity frame LG, the magnitude of the voltage signal becomes larger as the amount of the reflective light RL received by the pixel 321 increases. Then, in a case in which the pixel 321 receives reflective light RL having the same amount of light, a voltage signal is saturated in order of a pixel signal of the high-sensitivity frame HG for which the number of times of electric charge distribution is large, a pixel signal of the intermediate-sensitivity frame MG for which the number of times of electric charge distribution is intermediate, and a pixel signal of the low-sensitivity frame LG for which the number of times of electric charge distribution is small. FIG. 11 illustrates characteristics in which a pixel signal of a high-sensitivity frame HG is saturated at incident light amount SH, an intermediate-sensitivity frame MG is saturated at incident light amount SM, and a low-sensitivity frame LG is saturated at incident light amount SL.

For this reason, in the electric charge amount determining process P11 performed in the distance calculating unit 42, as described above, the magnitude (a voltage value V) of the pixel signal of the high-sensitivity frame HG is compared with the threshold Vth, and one of the pixel signal of the high-sensitivity frame HG, and the pixel signal of one of the intermediate-sensitivity frame MG and the low-sensitivity frame LG is selected as a pixel signal used for calculation of the distance D from the subject S on the basis of whether or not the magnitude of the pixel signal exceeds the threshold Vth. Then, in the electric charge amount determining process P11, in a case in which a pixel signal of one of the intermediate-sensitivity frame MG and the low-sensitivity frame LG is selected as a pixel signal used for calculation of the distance D from the subject S, the distance calculating unit 42 performs the electric charge amount determining process P12. In the electric charge amount determining process P12 in the distance calculating unit 42, as described above, the magnitude (a voltage value V) of the pixel signal of the intermediate-sensitivity frame MG is compared with the threshold Vth, and one of the pixel signal of the intermediate-sensitivity frame MG and the pixel signal of the low-sensitivity frame LG is selected as a pixel signal used for calculation of the distance D from the subject S on the basis of whether or not the magnitude of the pixel signal exceeds the threshold Vth.

In FIG. 11, since the magnitude (the voltage value V) of the pixel signal of the high-sensitivity frame HG exceeds the threshold Vth at incident light amount STH, at this time point, the flag signal FlagA is set as FlagA=1, and a pixel signal of one of the intermediate-sensitivity frame MG and the low-sensitivity frame LG is selected as a pixel signal used for calculation of the distance D from the subject S. In addition, until the incident light amount reaches STH, the flag signal FlagA is set as FlagA=0, and a pixel signal of the high-sensitivity frame HG is selected as a pixel signal used for calculation of the distance D from the subject S. In FIG. 11, since the magnitude (the voltage value V) of the pixel signal of the intermediate-sensitivity frame MG exceeds the threshold Vth at incident light amount STM, at this time point, the flag signal FlagB is further set as FlagB=1, and a pixel signal of the low-sensitivity frame LG is selected as a pixel signal used for calculation of the distance D from the subject S. In addition, between incident light amount STH and incident light amount STM, only the flag signal FlagA is set as FlagA=1, and the flag signal FlagB is set as FlagB=0. For this reason, in an incident light amount range between STH and STM, a pixel signal of the intermediate-sensitivity frame MG is selected as a pixel signal used for calculation of the distance D from the subject S.

In this way, also in the method of realizing a wide dynamic range according to the second embodiment, similar to the method of realizing a wide dynamic range according to the first embodiment, the distance calculating unit 42 can calculate the distance D from the subject S by switching the pixel signal to one of the intermediate-sensitivity frame MG or one of the low-sensitivity frame LG before the magnitude (the voltage value V) of the pixel signal is saturated. Because saturation resistance in a case in which reflective light RL having a large amount of light is incident of the pixel signals of the intermediate-sensitivity frame MG and the low-sensitivity frame LG are respectively improved up to the incident light amount SM and the incident light amount SL, by decreasing their number of times of electric charge distribution. In addition, in the method of realizing a wide dynamic range according to the second embodiment, since frames of three pixel signals having different sensitivity levels are used for calculating the distance D from the subject S, a wider dynamic range than that according to the method of realizing a wide dynamic range according to the first embodiment can be achieved.

The threshold Vth used by the distance calculating unit 42 in the electric charge amount determining processes P11 and P12 is a fixed or changeable value that is defined, determined or set for the amount of electric charge Q for which the electric charge accumulating unit CS included in a pixel 321 disposed in the distance image sensor 32 is saturated on the basis of the same thought as that according to the method of realizing a wide dynamic range according to the first embodiment. For this reason, detailed description of the thought of the threshold Vth used in the method of realizing a wide dynamic range according to the second embodiment will be omitted. In the description presented above, a case in which the threshold Vth compared with MAX(QH2, QH3) in the electric charge amount determining process P11 and the threshold Vth compared with MAX(QM2, QM3) in the electric charge amount determining process P12 have the same value has been described. However, the threshold Vth used in the electric charge amount determining process P11 and the threshold Vth used in the electric charge amount determining process P12 are not limited to the same value and may have different values.

In this way, the distance calculating unit 42 in the method of realizing a wide dynamic range according to the second embodiment selects one pixel signal among pixel signals, which correspond to the pixels 321 disposed at the same position, included in pixel signals of three frames having different sensitivity levels as a pixel signal used for calculating a distance D from a subject S. Thereafter, the distance calculating unit 42 calculates a distance D from a subject S by applying the amounts of electric charge Q (the amount of electric charge Q1, the amount of electric charge Q2, and the amount of electric charge Q3) represented by three voltage signals included in the selected pixel signal to Equation (1) described above.

Then, similar to the method of realizing a wide dynamic range according to the first embodiment, the distance calculating unit 42 repeats the process described above for each pixel 321 disposed within the light reception area 320 of the distance image sensor 32 and outputs distance information corresponding to one frame in which a distance D acquired at positions of all the pixels 321, the flag signal FlagA, and the flag signal FlagB are associated with each other. In this way, it can be easily determined whether the distance D included in the distance information output by the distance calculating unit 42 has been acquired using the pixel signal of the high-sensitivity frame HG, the pixel signal of the intermediate-sensitivity frame MG, or the pixel signal of the low-sensitivity frame LG by referring to the flag signal FlagA and the flag signal FlagB.

In the present invention, also in the method of realizing a wide dynamic range according to the second embodiment, similar to the method of realizing a wide dynamic range according to the first embodiment, the configuration of the distance calculating unit 42 for performing the electric charge amount determining processes P11 and P12 is not particularly limited. Accordingly, also in the method of realizing a wide dynamic range according to the second embodiment, for example, the distance calculating unit 42 may have a configuration including three frame memories corresponding to a pixel signal of each frame that has been acquired. In such a configuration, similar to the method of realizing a wide dynamic range according to the first embodiment, the distance calculating unit 42 performs selection of a pixel signal according to the electric charge amount determining processes P11 and P12 and calculates the distance D based on the selected pixel signal while reading pixel signals corresponding to the same pixel 321 stored in frame memories. In addition, for example, the distance calculating unit 42 may include one frame memory and, similar to the method of realizing a wide dynamic range according to the first embodiment, be configured to perform the electric charge amount determining processes P11 and P12 and calculation of the distance D in real time in synchronization with a timing at which pixel signals of different frames are acquired. In such a configuration, the distance calculating unit 42 acquires a set of pixel signals corresponding to three frames in order of the low-sensitivity frame LG, the intermediate-sensitivity frame MG, and the high-sensitivity frame HG and stores an acquired pixel signal of the low-sensitivity frame LG in the frame memory. Then, when a pixel signal of the intermediate-sensitivity frame MG is acquired, the distance calculating unit 42 reads a pixel signal of the low-sensitivity frame LG corresponding to the same pixel 321 stored in the frame memory, performs the electric charge amount determining process P12 for a pixel signal of the intermediate-sensitivity frame MG that is currently acquired and a pixel signal of the low-sensitivity frame LG read from the frame memory, and, in a case in which the pixel signal of the intermediate-sensitivity frame MG is selected, substitutes (overwrites) the pixel signal of the low-sensitivity frame LG stored in the frame memory with the pixel signal of the intermediate-sensitivity frame MG and adds the flag signal FlagB. Thereafter, when a pixel signal of the high-sensitivity frame HG is acquired, the distance calculating unit 42 reads a pixel signal of the intermediate-sensitivity frame MG or a pixel signal of the low-sensitivity frame LG corresponding to the same pixel 321 stored in the frame memory, performs the electric charge amount determining process P11 for a pixel signal of the high-sensitivity frame HG that is currently acquired and a pixel signal of the intermediate-sensitivity frame MG or a pixel signal of the low-sensitivity frame LG read from the frame memory, and, in a case in which the pixel signal of the high-sensitivity frame HG is selected, substitutes (overwrites) the pixel signal of the intermediate-sensitivity frame MG or a pixel signal of the low-sensitivity frame LG stored in the frame memory with the pixel signal of the high-sensitivity frame HG and adds the flag signal FlagA. Then, the distance calculating unit 42 performs calculation of the distance D at the position of each pixel 321.

Figure 12:
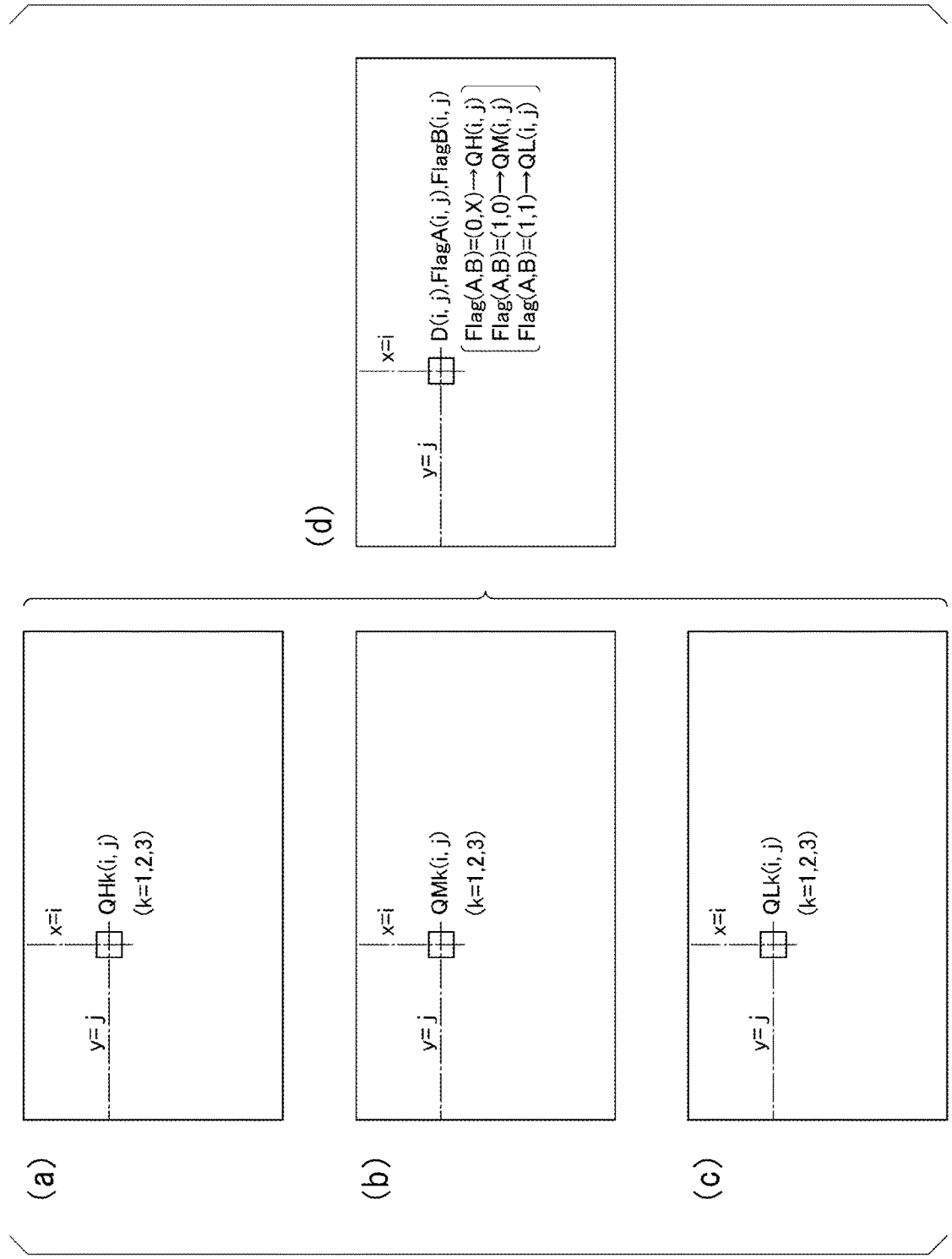
FIG. 12 is a diagram schematically illustrating one example of other configurations of frames in which information of a distance measured in the distance image capturing apparatus is included.

The configuration of distance information corresponding to one frame will be described. FIG. 12 is a diagram schematically illustrating one example of other configurations of frames in which information of a distance (distance information) measured in the distance image capturing apparatus 1 is included. (a) of FIG. 12 illustrates one example of the configuration of a high-sensitivity frame HG. (b) of FIG. 12 illustrates one example of the configuration of an intermediate-sensitivity frame MG. (c) of FIG. 12 illustrates one example of the configuration of a low-sensitivity frame LG. (d) of FIG. 12 illustrates one example of a frame of distance information.

As described above, the distance calculating unit 42 acquires a set of pixel signals corresponding to three frames including the low-sensitivity frame LG, the intermediate-sensitivity frame MG, and the high-sensitivity frame HG, selects one pixel signal for each pixel 321, and outputs distance information in which the acquired distance D, the flag signal FlagA and the flag signal FlagB are associated with one another. Similar to one example of the configuration of a frame in which information of a measured distance (distance information) illustrated in FIG. 8 is included, FIG. 12 illustrates one example of a frame in which distance information corresponding to the position of one pixel 321 disposed in the i-th row (here, $1 \le i \le y$) and the j-th column (here, $1 \le j \le x$) of the light reception area 320 of the distance image sensor 32 is included in each frame.

The distance calculating unit 42 selects one amount of electric charge Q among the amount of electric charge $QHk(i, j)$ (k=1, 2, 3) included in the high-sensitivity frame HG illustrated in (a) of FIG. 12 as a pixel signal, the amount of electric charge $QMk(i, j)$ (k=1, 2, 3) included in the intermediate-sensitivity frame MG illustrated in (b) of FIG. 12 as a pixel signal, and the amount of electric charge $QLk(i, j)$ (k=1, 2, 3) included in the low-sensitivity frame LG illustrated in (c) of FIG. 12 as a pixel signal in the electric charge amount determining processes P11 and P12. Then, the distance calculating unit 42 calculates the distance D from the subject S by applying the selected amount of electric charge Q to the Equation (1). Then, as illustrated in (d) of FIG. 12, the distance calculating unit 42 outputs a frame of the distance information in which a calculated distance $D(i, j)$, a flag signal $FlagA(i, j)$, and a flag signal $FlagB(i, j)$ are associated with each one other.

In the description of the method of realizing a wide dynamic range according to the second embodiment, similar to that of the method of realizing a wide dynamic range according to the first embodiment, a case in which the distance calculating unit 42 repeats the selection of a pixel signal according to the electric charge amount determining processes P11 and P12 and the calculation of the distance D based on the selected pixel signal for each pixel 321 disposed within the light reception area 320 of the distance image sensor 32 on the basis of pixel signals corresponding to one frame of each of the high-sensitivity frame HG, the intermediate-sensitivity frame MG, and the low-sensitivity frame LG has been described. However, also in the method of realizing a wide dynamic range according to the second embodiment, similar to the method of realizing a wide dynamic range according to the first embodiment, the electric charge amount determining process P11, the electric charge amount determining process P12, and the calculation of the distance D in the distance calculating unit 42 are not limited to be configured to be performed for each pixel 321, and the electric charge amount determining process P11, the electric charge amount determining process P12, and the calculation of the distance D may be configured to be performed for each block divided in predetermined units of a plurality of pixels 321.

Thereafter, similar to the method of realizing a wide dynamic range according to the first embodiment, the distance calculating unit 42 may generate a distance information image that visually represents distance information corresponding to one frame. Also in the distance information image generated here, similar to the method of realizing a wide dynamic range according to the first embodiment, a distance D acquired by the distance calculating unit 42 does not depend on which pixel signal is used for the acquisition of the distance among pixel signals of the high-sensitivity frame HG, the intermediate-sensitivity frame MG, and the low-sensitivity frame LG.

Similar to the method of realizing a wide dynamic range according to the first embodiment, the distance calculating unit 42 may generate a brightness image illuminated by light PO corresponding to a distance information image in which the shape of the subject S included within a measurement range of the distance D in the distance image capturing apparatus 1 is visually represented using brightness and darkness. However, similar to the method of realizing a wide dynamic range according to the first embodiment, the distance calculating unit 42 generates a brightness image by performing gain adjustment among the pixel signal of the high-sensitivity frame HG and pixel signals of the intermediate-sensitivity frame MG and the low-sensitivity frame LG by referring to the flag signal FlagA and the flag signal FlagB associated with a distance D in the distance information corresponding to one frame. In addition, according to a thought similar to that of the method of realizing a wide dynamic range according to the first embodiment, the distance calculating unit 42 may perform switching of all the frames of pixel signals used for generating a brightness image in accordance with states of the flag signal FlagA and the flag signal FlagB included in the distance information corresponding to one frame. In other words, in a case in which all the flag signals FlagA included in the distance information corresponding to one frame are set as FlagA=0, the distance calculating unit 42 may generate a brightness image on the basis of a pixel signal of the high-sensitivity frame HG. The distance calculating unit 42 may generate a brightness image on the basis of pixel signals of the intermediate-sensitivity frame MG in a case in which a flag signal FlagA included in the distance information corresponding to one frame is set as FlagA=1 and all the flag signals FlagB are set as FlagB=0 and may generate a brightness image on the basis of pixel signals of the low-sensitivity frame LG in a case in which two states of FlagB=0 and FlagB=1 are included in the flag signals FlagB.

As described above, also in the second embodiment, on the basis of a consideration similar to that of the first embodiment, the distance calculating unit 42 selects one pixel signal among pixel signals corresponding to pixels 321 disposed at the same position included in pixel signals of three frames having different sensitivity levels as a pixel signal used for calculating the distance D from the subject S using the electric charge amount determining processes P11 and P12. Thereafter, similar to the method of realizing a wide dynamic range according to the first embodiment, the distance calculating unit 42 calculates the distance D from the subject S by applying the amounts of electric charge Q (the amount of electric charge Q1, the amount of electric charge Q2, and the amount of electric charge Q3) represented by three voltage signals included in the selected pixel signal to the Equation (1). In this way, in the second embodiment, the distance calculating unit 42 can acquire a distance D having a high sensitivity level in a case in which the magnitude of the pixel signal is smaller than the threshold Vth and can acquire a distance D having saturation resistance raised to an intermediate level or a distance D having further raised high saturation in a case in which the magnitude of the pixel signal exceeds the threshold Vth. Accordingly, in the second embodiment, a wider dynamic range of the distance D acquired by the distance calculating unit 42 can be also achieved. In other words, in the second embodiment, a dynamic range that is wider than that according to the method of realizing a wide dynamic range according to the first embodiment can be achieved.

In the first embodiment, a case in which, by setting two fixed numbers of times of electric charge distribution in advance, frames of two pixel signals having different sensitivity levels are acquired as one set, and distance information corresponding to one frame is output has been described. In the second embodiment, a case in which, by setting three fixed numbers of times of electric charge distribution in advance, frames of three pixel signals having different sensitivity levels are acquired as one set, and distance information corresponding to one frame is output has been described. However, the number of the fixed numbers of times of electric charge distribution set in advance in the distance image capturing apparatus 1 is not limited to the numbers described in the first and second embodiments. In other words, the number of frames (frame number) of pixel signals acquired for outputting distance information corresponding to one frame in the distance image capturing apparatus 1 is not limited to the frame numbers described in the first and second embodiments. Accordingly, the frame number of pixel signals acquired for outputting distance information corresponding to one frame in the distance image capturing apparatus 1 may be four frames or more.

As described above, according to each embodiment of the present invention, in a distance image capturing apparatus using an imaging device having a divisional configuration in which a plurality of pixels each including one photoelectric conversion device and a plurality of electric charge accumulating units corresponding to this one photoelectric conversion device are disposed, a plurality of fixed numbers of times electric charge is distributed are set in advance. Then, in each embodiment of the present invention, by performing electric charge distribution driving for distributing electric charge generated in accordance with reflective light acquired by causing an emitted light pulse to be reflected by a subject among the electric charge accumulating units each number of times electric charge is divided that is set in advance, a plurality of frames of pixel signals having different sensitivity levels are acquired. Thereafter, in each embodiment of the present invention, the process of selecting a pixel signal used when a distance from a subject is measured is performed between frames of two pixel signals having different sensitivity levels. In the process of selecting this pixel signal, a pixel signal used for measuring a distance from a subject is selected on the basis of whether or not the amount of electric charge including reflective light from the subject that is represented by a pixel signal included in a frame of a pixel signal having a higher sensitivity level among frames of two pixel signals exceeds a threshold that is a criterion set in advance for an amount of electric charge that the electric charge accumulating unit saturates. More specifically, a pixel signal included in a frame of a pixel signal having a higher sensitivity level is selected as a pixel signal used when a distance from a subject is measured in a case in which the amount of electric charge including reflective light from the subject is equal to or smaller than a threshold, and a pixel signal included in a frame of a pixel signal having a lower sensitivity level is selected as a pixel signal used for measuring a distance from a subject in a case in which the amount of electric charge including reflective light from the subject exceeds the threshold. In each embodiment of the present invention, the process of selecting a pixel signal used for measuring a distance from a subject is performed between frames of each pixel signal that has been received.

In this way, in each embodiment of the present invention, one pixel signal used for measuring a distance from a subject is selected among pixel signals included in frames of a plurality of pixel signals that have been acquired, and the distance from the subject can be measured (calculated). In other words, in each embodiment of the present invention, a distance from a subject can be measured (calculated) in various states such as states in which the subject vehicle is present at a close position or is present at a far position, there is an environment in which strong background light is incident in accordance with a bright surrounding environment of the subject, there is an environment in which background light is not incident in accordance with a dark surrounding environment, the subject has high reflectivity for the light pulse, or the subject has low reflectivity. In this way, according to each embodiment of the present invention, a range in which a distance from a subject can be widened, in other words, a dynamic range in measurement of a distance can be widened by decreasing influences according to the status of the subject from which a distance is measured and changes in the environments.

As above, although the preferred embodiments of the present invention have been described, the present invention is not limited to these embodiments and modified examples thereof. Additions, omissions, substitutions, and other changes of components can be made in a range not departing from the concept of the present invention. In addition, the present invention is not limited to the description presented above and is limited only by the scope of the appended claims.

INDUSTRIAL APPLICABILITY

According to each embodiment described above, a range in which a distance from a subject is measured can be widened by decreasing influences according to a status of a subject from which a distance is measured and changes in environments without employing a complicated configuration and performing complex control in a distance image capturing apparatus using an imaging device having a divisional configuration.

REFERENCE SIGNS LIST 1 distance image capturing apparatus
2 light source unit
21 light source device
22 diffusion plate
3 light receiving unit
31 lens
32 distance image sensor
320 light reception area
321 pixel
322 control circuit
323 vertical scanning circuit
324 horizontal scanning circuit
325 pixel signal processing circuit
4 distance image processing unit
41 timing control unit
42 distance calculating unit
PD photoelectric conversion device
GD drain gate transistor
RU pixel signal reading unit
O output terminal
G reading gate transistor
FD floating diffusion
C electric charge accumulating capacitor
RT reset gate transistor
SF source follower gate transistor
SL selection gate transistor
CS electric charge accumulating unit
PO light pulse
RL reflective light
S subject

The invention claimed is:

1. A distance image capturing apparatus comprising:
a light source unit that emits an intermittent light pulse into a space that is an imaging target at a predetermined period;
a light receiving unit that includes a distance image sensor in which a plurality of pixels each including a photoelectric conversion device generating electric charge corresponding to incident light and a plurality of electric charge accumulating units accumulating the electric charge and distributing and accumulating the electric charge to the electric charge accumulating units in synchronization with emission of the light pulse are arranged in a two-dimensional matrix pattern; and
a distance image processing unit that acquires a distance from a subject present in the space on the basis of an electric charge amount that is an amount of the electric charge distributed by a predetermined fixed number of electric charge distribution and added up in each of the electric charge accumulating units,
wherein the distance image processing unit:
acquires at least two electric charge amounts added up in the electric charge accumulating units with different numbers of electric charge distribution in the distance image sensor as one set, and
selects one of a first electric charge amount that is the electric charge amount added up with a larger number of electric charge distribution and a second electric charge amount as an electric charge amount used for acquiring the distance, the second electric charge amount being the electric charge amount added up with a smaller number of electric charge distribution acquired as the set with the first electric charge amount, on the basis of a comparison result of the first electric charge amount with a threshold set in advance.

2. The distance image capturing apparatus according to claim 1, wherein the first electric charge amount and the second electric charge amount are amounts of the electric charge including electric charge generated in accordance with reflective light acquired by causing the light pulse to be reflected by the subject.

3. The distance image capturing apparatus according to claim 2, wherein the distance image processing unit selects the first electric charge amount when the first electric charge amount is equal to or smaller than the threshold and selects the second electric charge amount when the first electric charge amount exceeds the threshold.

4. The distance image capturing apparatus according to claim 3,
wherein the first electric charge amount includes a (1-1)-th electric charge amount that is the amount of electric charge including electric charge generated in accordance with the reflective light during a period in which the light pulse is emitted and a (1-2)-th electric charge amount that is the amount of electric charge including electric charge generated in accordance with the reflective light during a period after stop of the emission of the light pulse, and
wherein the distance image processing unit selects one of the first electric charge amount and the second electric charge amount as an electric charge amount used for acquiring the distance on the basis of a result of comparison between Qa and Qb, the Qa being a larger electric charge amount out of the (1-1)-th electric charge amount and the (1-2)-th electric charge amount, and the Qb being the threshold.

5. The distance image capturing apparatus according to claim 1, wherein the distance image processing unit outputs a flag signal that represents the electric charge amount selected for acquiring the distance.

6. The distance image capturing apparatus according to claim 1, wherein the distance image processing unit selects an electric charge amount used for acquiring the distance for each of the pixels.

7. The distance image capturing apparatus according to claim 1, wherein the distance image processing unit selects an electric charge amount used for acquiring the distance for each unit of a block acquired by dividing an area in which the pixels are arranged in the distance image sensor into a plurality of parts.

8. The distance image capturing apparatus according to claim 1, wherein the threshold is a value set for an electric charge amount that can be added up and stored in the electric charge accumulating units being saturated.

9. The distance image capturing apparatus according to claim 8, wherein the threshold is variable.

10. The distance image capturing apparatus according to claim 1, wherein the electric charge accumulating unit includes an electric charge accumulating capacitor that accumulates the electric charge.

11. A distance image capturing method using a distance image capturing apparatus that includes: a light source unit that emits an intermittent light pulse into a space that is an imaging target at a predetermined period; a light receiving unit that includes a distance image sensor in which a plurality of pixels each including a photoelectric conversion device generating electric charge corresponding to incident light and a plurality of electric charge accumulating units accumulating the electric charge and dividing and accumulating the electric charge among the electric charge accumulating units in synchronization with emission of the light pulse are arranged in a two-dimensional matrix pattern; and a distance image processing unit that acquires a distance from a subject present in the space on the basis of an electric charge amount that is an amount of the electric charge distributed by a predetermined fixed number of times of electric charge distribution and added up in each of the electric charge accumulating units, the distance image capturing method comprising:

acquiring at least two electric charge amounts added up in the electric charge accumulating units with different numbers of electric charge distribution in the distance image sensor as one set by the distance image processing unit, and selecting one of a first electric charge amount that is the electric charge amount added up with a larger number of electric charge distribution and a second electric charge amount as an electric charge amount used for acquiring the distance, the second electric charge amount being the electric charge amount added up with a smaller number of electric charge distribution acquired as the set with the first electric charge amount, on the basis of a comparison result of the first electric charge amount with a threshold set in advance by the distance image processing unit.

\* \* \* \* \*